US008582733B1

(12) United States Patent
Larson

(10) Patent No.: US 8,582,733 B1
(45) Date of Patent: Nov. 12, 2013

(54) PHONE SYSTEM WITH METHODOLOGY FOR CALL PARKING

(71) Applicant: RingCentral, Inc., San Mateo, CA (US)

(72) Inventor: Curt T. Larson, San Francisco, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

(21) Appl. No.: 13/631,425

(22) Filed: Sep. 28, 2012

(51) Int. Cl.
H04M 11/00 (2006.01)

(52) U.S. Cl.
CPC .................................... H04M 11/00 (2013.01)
USPC ................. 379/93.01; 379/93.24; 379/201.01

(58) Field of Classification Search
USPC ........... 379/93.24, 93.01, 93.05, 134, 201.01, 379/202.01, 201.03
See application file for complete search history.

(56) References Cited

U.S. PATENT DOCUMENTS

| 7,702,669 | B2 | 4/2010 | Vendrow et al. | |
|---|---|---|---|---|
| 8,098,810 | B2 | 1/2012 | Lyman | |
| 8,134,727 | B1 | 3/2012 | Shmunis et al. | |
| 8,204,479 | B2 | 6/2012 | Vendrow et al. | |
| 8,213,587 | B2 | 7/2012 | Vendrow | |
| 8,275,110 | B2 | 9/2012 | Vendrow | |
| 8,285,267 | B2 | 10/2012 | Vendrow et al. | |
| 2005/0201533 | A1* | 9/2005 | Emam et al. | 379/88.19 |
| 2006/0256789 | A1 | 11/2006 | Otto et al. | |
| 2008/0151874 | A1* | 6/2008 | Wynn | 370/352 |
| 2008/0207166 | A1* | 8/2008 | Aerrabotu et al. | 455/411 |
| 2008/0219423 | A1 | 9/2008 | Lyman | |
| 2008/0222549 | A1 | 9/2008 | Lyman | |
| 2009/0080029 | A1 | 3/2009 | Vendrow et al. | |
| 2009/0086278 | A1 | 4/2009 | Vendrow et al. | |
| 2009/0086947 | A1 | 4/2009 | Vendrow | |
| 2009/0086950 | A1 | 4/2009 | Vendrow et al. | |
| 2009/0086953 | A1 | 4/2009 | Vendrow | |
| 2009/0141875 | A1* | 6/2009 | Demmitt et al. | 379/88.14 |
| 2009/0141884 | A1 | 6/2009 | Lyman | |
| 2010/0035594 | A1 | 2/2010 | Vendrow et al. | |
| 2010/0099390 | A1 | 4/2010 | Vendrow et al. | |
| 2010/0128861 | A1 | 5/2010 | Vendrow et al. | |
| 2010/0128862 | A1 | 5/2010 | Vendrow | |
| 2010/0128867 | A1 | 5/2010 | Vendrow et al. | |
| 2010/0130172 | A1 | 5/2010 | Vendrow et al. | |
| 2010/0130228 | A1 | 5/2010 | Vendrow et al. | |

(Continued)

OTHER PUBLICATIONS

PanTerraNetworks, WorldSmart's Visual Call Park dated Aug. 27, 2012 (1 page).

(Continued)

Primary Examiner — Melur Ramakrishnaiah
(74) Attorney, Agent, or Firm — Hickman Palermo Truong Becker Bingham Wong LLP

(57) ABSTRACT

A phone system with a methodology for call parking is described. According to one embodiment of the present invention, a user of a communications endpoint device can use a user interface at the communications endpoint device to select persons to notify of a parked call. Upon successfully parking the call, the phone system notifies the selected persons in the manner specified in their account profiles. Such manner can include sending an e-mail to the selected person or sending a text message to the selected person. Advantageously, the manner for notifying the selected persons of the parked call is determined by the selected persons themselves through configuration of their account profiles thereby alleviating the user parking the call from having to determine the manner for notifying the selected persons.

18 Claims, 20 Drawing Sheets

(56) References Cited

U.S. PATENT DOCUMENTS

| | | |
|---|---|---|
| 2010/0174807 A1 | 7/2010 | Lyman et al. |
| 2010/0183134 A1 | 7/2010 | Vendrow et al. |
| 2010/0184408 A1 | 7/2010 | Vendrow et al. |
| 2011/0110511 A1 | 5/2011 | Vendrow et al. |
| 2011/0130168 A1 | 6/2011 | Vendrow et al. |
| 2011/0177797 A1 | 7/2011 | Vendrow et al. |
| 2012/0021730 A1 | 1/2012 | Vendrow |
| 2012/0039449 A1 | 2/2012 | Vendrow et al. |
| 2012/0042011 A1 | 2/2012 | Vendrow et al. |
| 2012/0134355 A1 | 5/2012 | Vendrow et al. |

OTHER PUBLICATIONS

Fonality Talking Business, Fonality PBXtra—Call Park dated 2010 (3 pages).

* cited by examiner

PHONE SYSTEM WITH METHODOLOGY FOR CALL PARKING

RELATED APPLICATIONS

This application is related to the following applications: (1) U.S. patent application Ser. No. 13/251,193, "Inbound Call Identification and Management", filed Sep. 30, 2011; (2) U.S. patent application Ser. No. 12/237,213, "Active Call Filtering, Screening, and Dispatching", filed Sep. 24, 2008; and (3) U.S. patent application Ser. No. 12/234,596, "Active Call Processing and Notifications", filed Sep. 19, 2008. All of these applications are hereby incorporated by reference in their entirety.

TECHNICAL FIELD

The present invention relates generally to phone systems and, more particularly, to a phone system with a methodology for call parking.

BACKGROUND

Private Branch Exchange (PBX)

A private branch exchange (PBX) is an electronic phone system serving a particular business or office. A typical PBX has a number of individual "extension" lines connected to phones in the organization and a fewer number of "trunk" lines connected to a circuit-switched phone network such as the public switched telephone network ("PSTN"). On the expectation only a small number of the total number of phones in the organization will be connected on a phone call over the circuit-switched phone network at the same time, the PBX allows the numerous extension links to share the fewer trunk lines, thereby saving the organization the expense of a dedicated phone line to the circuit-switched phone network for each phone in the organization.

Modern PBXs provide voice over internet protocol ("VoIP") capabilities allowing phones and other computing devices in an organization to send and receive voice, video, and other data over a packet-switched data network in Internet Protocol ("IP") network packets. Many of these PBXs also interoperate with a circuit-switched phone network to facilitate phone calls between VoIP phones connected to the packet-switched network and analog or cell phones connected to the circuit-switched phone network.

A recent trend in phone systems for businesses and organizations is that of the "hosted PBX", also referred to as a "virtual PBX" or "cloud PBX". A hosted PBX is a hosted service operated by a service provider that provides PBX functionality to multiple business and organizations. However, it appears to each business and organization that they have a dedicated PBX. The hardware and software implementing the hosted service is typically located in and operates in one or more data centers or other hosting facilities separate from the business and organizations using the hosted service and to which the business and organizations are connected, typically by a packet-switched data network such as the Internet.

Call Parking

One call convenience feature provided by many PBXs is known as "call parking". As typically implemented by a PBX, call parking allows a caller to place an active call on hold from the caller's phone and have that call resume from a different phone, perhaps by a different party. The caller parking the call may be referred to as the "parker". The party that resumes the parked call may be referred to as the "unparker". After parking the call, the parker's phone is disconnected from the call, but the call is not terminated. The parker does not need to wait for the parked call to resume before the parker can hang up his or her phone. A PBX typically implements call parking by assigning the active call to an unused extension which is then displayed on an interface of the parker's phone. The parked call is then resumed at another phone by the unparker by connecting the other phone to the assigned extension.

To notify others of a parked call, the parker typically announces the assigned extension over a public address system. For example, a cashier at a grocery store may receive a call from a customer for the bakery. Upon receiving the call, the cashier may park the call and announce over the grocery store's public address system "call for bakery on extension 9000". Thereafter, someone in the bakery may unpark the call from a phone in the bakery area of the store.

Unfortunately, notification by public address system is impractical in many situations. For example, many offices, businesses, and organizations are not outfitted with a public address system. Further, the parker may wish to park the call for a phone at location distant from the parker's phone. Further still, the parker may not know the current location of the intended unparker.

Some PBXs allow the parker to enter the extension of a particular phone to signal. These PBXs then signal the particular phone to notify of the parked call. For example, the PBXs may ring the particular phone and/or cause a light of the particular phone to flash or illuminate. However, this is ineffective if no one is near the particular phone to hear or see the signal or if the parker is unsure of which particular phone to signal.

Accordingly, there is a need for phone systems with call parking features that implement more reliable and convenient techniques for notifying persons of parked calls.

SUMMARY

The above deficiencies and other problems associated with PBXs with call parking features are reduced or eliminated by the disclosed phone system, auxiliary server with services supporting the phone system, communications endpoint device, user interfaces for such endpoint devices, and associated techniques for call parking.

According to one embodiment of the present invention, a user of the communications endpoint device can initiate a park of an active call using the user interface. After initiating the park, the user can use the user interface to select persons to notify of the parked call. The user can then use the user interface to actually park the active call. Upon successfully parking the call, the selected persons are notified of the parked call in the manner specified in their account profiles. Such manner may include sending an e-mail to the selected person or sending a text message to the selected person, as just two examples. Advantageously, the manner for notifying the selected persons of the parked call is determined by the selected persons themselves through configuration of their account profiles thereby alleviating the parker from having to determine the manner for notifying the selected persons.

In some embodiments, the phone system is part of a hosted PBX service.

In one embodiment, the communications endpoint device is a smartphone or other portable wireless communications and computing device such as, for example, an Apple iPhone or Android-based smartphone and the user interface is touch screen-based user interface.

In one embodiment, in addition to selecting persons to notify of the parked call, the parker can provide through the user interface a text note that is communicated to the selected persons in the parked call notification.

In one embodiment, the parker can select through the user interface persons to notify of the parked call privately such that only those selected persons can unpark the parked call.

These and other embodiments are described herein.

BRIEF DESCRIPTION OF THE DRAWINGS

A further understanding of the aforementioned embodiments of the present invention as well as additional embodiments thereof should be made with reference to the Description of Embodiments below, in conjunction with the following drawings in which like reference numerals refer to corresponding parts throughout the figures.

DESCRIPTION OF EMBODIMENTS

Introduction

In the following description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Embodiments of a phone system, an auxiliary server with services supporting the phone system, a communications endpoint device, user interfaces for such endpoint devices, and associated techniques for call parking are described. In some embodiments, the phone system is part of a hosted PBX service. In some embodiments, the endpoint device is a smartphone or other portable wireless communications and computing device such as, for example, an Apple iPhone or Android-based smartphone.

Phone System

For simplicity, in the discussion that follows, a phone system that includes a number of sub-components implemented on a server is used as an exemplary embodiment. However, it should be understood that one or more of these sub-components may distributed, partitioned, and/or replicated across more than one server for fault tolerance, scalability, locality, or other purposes according to the requirements of the implementation at hand.

Figure 1:
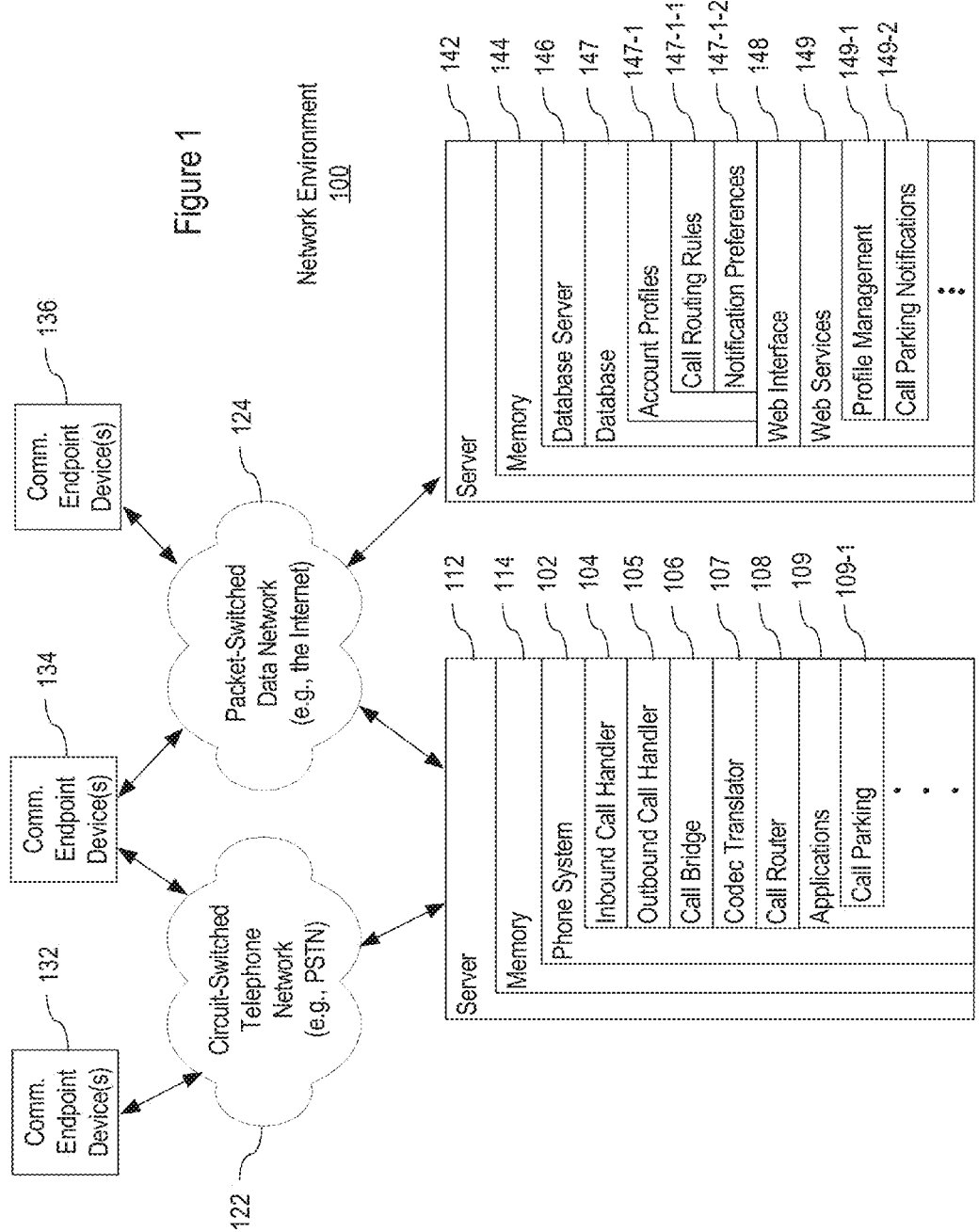
FIG. 1 is a block diagram illustrating a network environment that includes a phone system and an auxiliary server with services supporting the phone system in accordance with some embodiments.

Attention is now directed toward an embodiment of the phone system. FIG. 1 is a block diagram illustrating a network environment 100 that includes a phone system 102 and an auxiliary server 142 supporting the phone system 102 in accordance with some embodiments. The phone system 102 is stored in a memory 114 of a server 112 on which the phone system 102 operates. The server 112 may be a general-purpose computing device such as the computer system 2000 of FIG. 20, as one example.

The phone system 102 is connected to a circuit-switched telephone network 122 and a packet-switched data network 124 through the server 112. The circuit-switched telephone network 122 may be the public-switched telephone network ("PSTN"), as one example. The circuit-switched telephone network 122 may include both digital and analog circuits including DS-0 circuits, T-carrier circuits (e.g., a T1 circuit), and fiber optic circuits (e.g., SONET and "OC circuits"), among others. The circuit-switched telephone network 122 may carry call signaling information (e.g., Caller ID information) according to digital signal protocols including Channel Associated Signals ("CAS"), Integrated Services Digital Network ("ISDN"), Basic Rate Interface ("ISDN-BRI"), Primary Rate Interface ("ISDN-BRI"), and Signaling System 7 ("SS7"), as some examples. The packet-switched data network 124 may be any packet-switched data network capable of carrying Internet Protocol ("IP") packets. The packet-switched data network 124 may carry voice, video, and other data according to voice over Internet protocols ("VoIP") and/or Web application protocols. The VoIP protocols that may be carried by packet-switched data network 124 include the Session Initiation Protocol ("SIP"), H.323, the Media Gateway Control Protocol ("MGCP"), as just some examples. The Web application protocols that may be carried by packet-switched data network 124 include the Hyper Text Transfer Protocol ("HTTP"), the Real-time Transport Protocol ("RTP"), and the Simple Mail Transfer Protocol ("SMTP"), among others.

The server 112 may connect to the circuit-switched telephone network 122 through telephony hardware including analog interface cards, digital interface cards, or a channel bank, as just some examples. Other mechanisms for interfacing with the circuit-switched telephone network 122 are possible and the server 112 is not limited to any particular mechanism. The server 112 may connect to the packet-switched data network 124 through a network interface card ("NIC") or other appropriate mechanism.

Various communications endpoint devices 132, 134, and 136 may connect to server 112. The communications endpoint devices 132, 134, and 136 include those 132 that connect to server 112 over the circuit-switched telephone network 122, those 134 that are capable of connecting to server 112 over the circuit-switched telephone network 122 or the packet-switched data network 124, and those 136 that connect to the server 112 over the packet-switched data network 124.

The communications endpoint devices 132 include traditional analog telephones, digital telephones, ISDN phones, and cellular phones, among others. The cellular phones may connect to the circuit-switched telephone network 122 via a cellular network (e.g., a GSM network or CDMA network). The communications endpoint devices 134 include multi-mode phones such as, for example, a smartphone, a smartphone with a softphone application, a hand-held cellular phone, or other mobile communications device with wireless and cellular network capabilities. The communications endpoint devices 134 may connect to the circuit-switched telephone network 122 through a cellular network. The communications endpoint devices 134 may connect to the packet-switched data network 124 via a wireless data network (e.g., an IEEE 802.11 network or IEEE 802.16 network). The communications endpoint devices 136 include IP-based computing devices connected wired or wirelessly to the packet-switched data network 124. The communications endpoint devices 136 include IP telephones and personal and mobile computing devices running softphone software. The communications endpoint devices 136 may connect to the packet-switched data network 124 through a wired (e.g., a LAN or WAN) or wireless data network.

The memory 114 may include one or more high-speed random access memories and may also include one or more non-volatile memories, such as one or more magnetic disk storage devices, one or more flash memory devices, or one or more other non-volatile solid-state memory devices.

The phone system 102 may be a software application executing on the server 112 with aid of an operating system (not illustrated) that is also stored in the memory 114 and executing on the server 112. Such an operating system may be a conventional server operating system such as a Unix-based, Linux-based, or Windows-based server operating system, as just some examples. In some implementations, at least a portion of the phone system 102 is implemented as part of the server operating system. Alternatively, the entire phone system 102 may be implemented as a software application that executes as a software layer on top of the operating system.

In some embodiments, the software components stored in memory 114 may include an operating system (not illustrated) and the phone system 102. The phone system 102 includes an inbound call handler module (or set of instructions) 104, an outbound call handler module (or set of instructions) 105, a call bridge module (or set of instructions) 106, a codec translator module (or set of instructions) 107, a call router module (or set of instructions) 108, and phone system applications (or sets of instructions) 109.

The inbound call handler 104 handles incoming call requests to a phone number managed by the phone system 102 from a phone number that is not managed by the phone system 102. Such handling may include instantiating a data structure in memory 114 representing a communication channel between the calling communications endpoint device and the phone system 102 and instantiating a data structure in memory 114 representing a communication channel between the phone system 102 and the called communications endpoint device. Other incoming call handling functions performed by the inbound call handler 104 may include determining the managed phone number the calling communications endpoint device has dialed, determining the identity of the user of the calling communications endpoint device (i.e., authenticating the caller), and determining the identity of the calling communications endpoint device. Exemplary techniques for inbound call identification and management that may be employed by the inbound call handler 104 are described in U.S. patent application Ser. No. 13/251,193, "Inbound Call Identification and Management", filed Sep. 30, 2011, the contents of which is hereby incorporated by reference in its entirety.

The outbound call handler 105 handles dial requests from a phone number managed by the phone system 102 to a phone number is not managed by the phone system 102. Such handling may include instantiating a data structure in memory 114 representing a communication channel between the calling communications endpoint device and the phone system 102 and instantiating a data structure in memory 114 representing a communication channel between the phone system 102 and the called communications endpoint device. Other outgoing call handling functions performed by the outbound call handler 105 may include authenticating and authorizing the caller or the calling communications endpoint device to make outbound calls.

The call bridge 106 connects communication channels together for the purpose of passing call media information between them. For example, where there are two communication channels for a calling communications endpoint device and a called communications endpoint device, the call bridge 106 passes call media information coming from the calling communications endpoint device to the called communications endpoint device, and similarly, passes call media information from the called communications endpoint device to the calling communications endpoint device. Call media information includes audio information, video information, data information (e.g., text), or some combination of audio, video, and data. The calling communications endpoint device and the called communications endpoint device may send and receive call media information in different information formats. For example, the calling communications endpoint device may be a VoIP phone connected to the phone system 102 through the packet-switched data network 124 while the called communications endpoint device may be an analog phone, a cell phone, or a smartphone connected to the phone system 102 through the circuit-switched telephone network 122. Alternatively, the calling communications endpoint device and called communications endpoint device may both be VoIP phones that use different audio and/or video digital encoding formats to send and receive call media information. In these cases where the calling communications endpoint device and the called communications endpoint device send and receive call media information in different information formats, the call bridge 106 may perform information translation and/or transformation functions on call media information. Another function of the call bridge 106 may be to determine whether the calling communication device and the called communication device are capable of sending and receiving call media information directly between each other, bypassing the call bridge 106. In this case, call control information may still pass through the phone system 102.

The codec translator 107 performs decoding, encoding, and transcoding functions on call media information as necessary when such call media information transits the packet-switched data network 124. The codec translator 107 may support difference codecs for decoding, encoding, and transcoding in different encoding formats. The codecs supported by codec translator 107 may include, but are not required or limited to, G.711, G.726, G.729A, GSM, iLBC, Speex, MP3, and others.

The call router 108 routes incoming calls based on the dialed managed phone numbers. More specifically, a managed phone number may be assigned to an account having an account profile 147-1 stored in the database 147. The managed phone number may be associated with a set of call routing rules 147-1-1 through the account profile 147-1 of the account to which the managed phone number is assigned. When the phone system 102 receives an incoming call for the managed phone number, the call router 108 applies the associated call routing rules 147-1-1 to determine how to route the incoming call. The possible call routing rules 147-1-1 that may be applied by the call router 108 is beyond the scope of this description but may include such actions as directing the incoming call to the account holder's voicemail, prompting the caller for information, and other call routing actions. Exemplary techniques for call routing that may be employed by the call router 108 are described in U.S. patent application Ser. No. 12/237,213, "Active Call Filtering, Screening, and Dispatching", filed Sep. 24, 2008 and Ser. No. 12/234,596, "Active Call Processing and Notifications", filed Sep. 19, 2008, the contents of which are hereby incorporated by reference in their entirety.

The phone system 102 may include a number of applications 109 include call parking application 109-1. Generally, call parking application 109-1 enables a user of a communications endpoint device on an active call through the phone system 102 to place the call on hold in such a way that the call can be resumed at that communications endpoint device or another communications endpoint device. After a call has been parked, the parked call is subsequently identifiable by a label referred to in this description as an "orbit". Typically, the orbit is a short, two to three digit, number, but may be shorter or longer. In some embodiments, the orbit is assigned to the parked call by the call parking application 109-1 from a set of available orbits. In other embodiments, the parker may select an orbit from the set of available orbits when parking the call.

Figure 2:
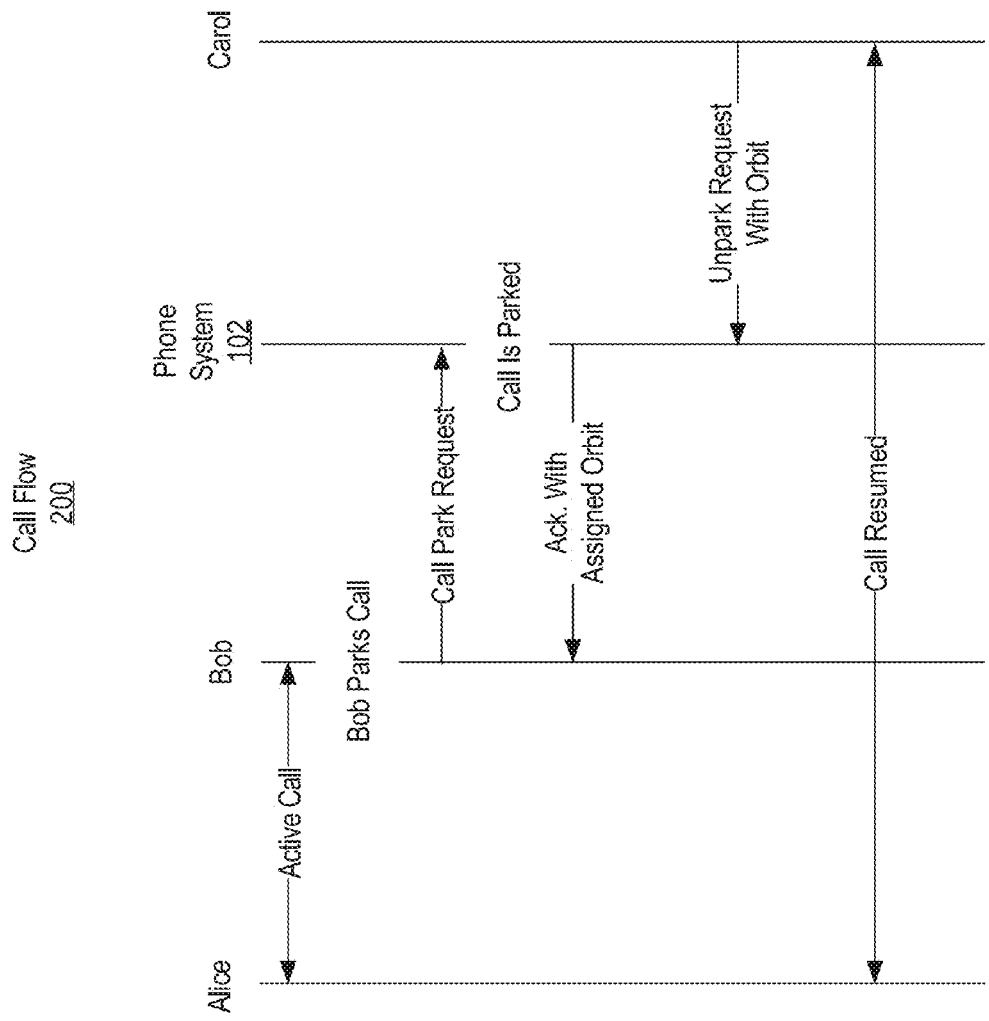
FIG. 2 is a high-level call flow for parking an active call in accordance with some embodiments.

A high-level call flow 200 for parking an active call through the phone system 102 is shown in FIG. 2 according to some embodiments. The flow 200 shows user Alice and Bob engaged in an active call through the phone system 102. Bob then parks the active call by sending a call park request from his communications endpoint device to the phone system 102. The call park request may be a SIP message, for example. Upon receiving the call park request, the call parking application 109-1 parks the active call and assigns an orbit to the parked call. The assigned orbit is communicated to Bob's communications endpoint device in a message from the phone system 102 acknowledging that the active call was successfully parked. The acknowledgment message may also be a SIP message, for example. Carol then sends an unpark call request to the phone system 102 specifying the assigned orbit of the parked call. The unpark call request may be a SIP message, for example. The phone system 102 then resumes the parked call between Alice and Carol.

In addition to the call parking application 109-1, the phone system 102 may support other phone applications 109 (not shown) such as a voicemail application, a call forward application, an automated greeting application, a call recording application, a missed call notification application, among other applications.

It should be appreciated that the phone system 102 is only one example of a phone system 102, and that the phone system 102 may have more or fewer components than shown, may combine two or more components, or may have a different configuration or arrangement of the components. Further, the various components shown in FIG. 1 may be implemented in hardware, software, or a combination of both hardware and software, including one or more signal processing and/or application specific integrated circuits.

Auxiliary Server

For simplicity, in the discussion that follows, a database server, a database, a web interface, and web services implemented on a server is used as an exemplary embodiment. However, it should be understood that one or more of these components, or sub-components thereof, may distributed, partitioned, and/or replicated across more than one server for fault tolerance, scalability, locality, or other purposes according to the requirements of the implementation at hand. Further, the phone system 102, or sub-components thereof, may reside on the same server as components 146, 147, 148, and/or 149, or sub-components thereof, that are depicted in FIG. 1 as residing on the auxiliary server 142. Thus, it should be understood that the depiction of separate servers 112 and 142 in FIG. 1 is for convenience of explanation and understanding only. It is not a requirement that the phone system 102 reside on a server or a servers that are separate from the server or servers on which the database server 146, database 147, web interface 148, and/or web services 149 reside. Overall, any convenient arrangement of the server components depicted in FIG. 1 on one or more servers capable of supporting the call parking techniques described herein may be used according to the requirements of the implementation at hand.

The server 112 on which the phone system 102 operates may be connected to the auxiliary server 142. The auxiliary server 142 may be co-located with the server 112, for example in the same data center or other hosting facility. Alternatively, the auxiliary server 142 may be located remotely from server 112. The server 112 and the auxiliary server 142 may be connected by the packet-switched data network 124 or by another data network (e.g., a LAN or WAN).

In some embodiments, the auxiliary server 142 is connected to the packet-switched data network 124 so that the web interface 148 is accessible to the communications endpoint devices 134 and 136 over the packet-switched data network 124. In these embodiments, the communications endpoint devices 134 and 136 may indirectly access the database server 146 and the database 147 by way of the web interface 148 and/or the web services 149.

In some embodiments, the phone system 102 accesses the database server 146 over a data network that connects the servers 112 and the auxiliary server 142. In some embodiments, the phone system 102 accesses the web interface 148 over the data network. In these embodiments where the phone system 102 accesses the web interface 148 over the data network, the phone system 102 may indirectly access the database server 146 and the database 146 by way of the web interface 148 and/or the web services 149.

The memory 144 may include one or more high-speed random access memories and may also include one or more non-volatile memories, such as one or more magnetic disk storage devices, one or more flash memory devices, or one or more other non-volatile solid-state memory devices.

Each of the database server 146, the web interface 148, and the web services 149 may be a software application executing on the auxiliary server 142 with aid of an operating system (not illustrated) that is also stored in the memory 144 and executing on the auxiliary server 142. Such an operating system may be a conventional server operating system such as a Unix-based, Linux-based, or Windows-based server operating system, as just some examples.

In some embodiments, the software components stored in memory 144 may include an operating system (not illustrated), a database server 146 (or set of instructions), a database 147, a web interface 148 (or set of instructions), and one or more web services 149 (or sets of instructions).

The database server 146 may be any conventional database management system such a commercially-available or open-source database management system. The database server 146 manages the database 147 and provides a network accessible interface by which clients of the database server 146 can read information from and write information to the database 147.

The database 147 represents the actual database data stored in memory 144. The database 147 stores account profiles 147-1 for users of the phone system 102. Each account profile 147-1 in the database 147 may correspond to one user. An account profile 147-1 may contain an identifier of the corresponding user ("user id"), call routing rule information 147-1-1, and call parking notification preference information 147-1-2.

The call parking notification preference information 147-1-2 of an account profile 147-1 represents the corresponding user's preferences for receiving notifications of parked calls. The preference information 147-1-2 may include a Boolean value indicating whether the corresponding user would like to receive notification of parked calls at all or whether the corresponding user would not like to receive any notification of parked calls. If, according to the notification preference information 147-1-2, the corresponding user would like to receive notification of parked calls, the notification preference information 147-1-2 for the corresponding user may additionally specify how and in what manner the corresponding user would like to receive notification of parked calls. Some possible ways in which the corresponding user can be notified include by e-mail message, in which case the notification preference information 147-1-2 for the corresponding user includes an e-mail address or e-mail addresses of the corresponding user, and/or by text message, in which case the notification preference information 147-1-2 for the corresponding user includes a phone number.

The notification preference information 147-1-2 may also specify situational preferences such as, for example, time of day constraints or location constraints. An example of a time of day constraint is "notify the corresponding user of parked calls only during the hours of 9 AM to 5 PM." Another example of a time of day constraint is "notify the corresponding user of parked calls by e-mail during the house of 9 AM to 5 PM and notify the corresponding of parked calls by text message outside those hours." Location constraints may be facilitated by Global Positioning Satellite ("GPS") information provided to the auxiliary server 142 from a Web application executing on a GPS-capable communications endpoint devices 134 or 136. An example of a location constraint is "notify the corresponding user of parked calls by text message when the corresponding user is away from the office having specified geo-position coordinates." Location constraints may be facilitated by location information other than GPS information, such as IP address, WiFi, or cell phone tower location information gathered from endpoint devices.

The account profiles 147-1 may be grouped by organization, business, or customer of the service provider of the phone system 102. These groups may be further sub-grouped by department, division, office, or other convenient or logical sub-grouping.

The web interface 148 provides a network accessible interface to communications endpoint devices 134 and 136 and/or the phone system 102 by which the communications endpoint devices 134 and 136 can access and interact with the web services 149. The web interface 148 may be based on Internet standard protocols such as, for example, the Hyper Text Transfer Protocol ("HTTP") or secured variants thereof such as the Secure-Hyper Text Transfer Protocol ("HTTPS"). The protocols may carry information in a variety of different data formats such as in the Hyper Text Markup Language ("HTML") and the eXtensible Markup Language ("XML") to name just a few.

A number of different web services 149 may be accessible through the web interface 148. Among them may be profile management service 149-1 and a parked call notification service 149-2. The profile management service 149-1 allows users to manage their account profiles 147-1 including their call routing rules 147-1-1 and their parked call notification preferences 147-1-2. The profile management service 149-1 may drive a Web browser-based user interface displayed on a communications endpoint device 134 or 136 or another computing device connected to the auxiliary server 142 through the packet-switched data network 124. The profile management server 149-1 may interact with the database server 146 to read information from account profiles 147-1 for display on user interfaces and to update account profiles 147-1 based on information received from the users.

The parked call notification service 149-2 is response for sending parked call notifications to users in accordance with the notification preferences 147-1-2. The parked call notification service 149-2 may accept as input as list of one or more account profile 147-1 identifiers and information identifying a parked call. The information identifying the parked call may include such information as the orbit, the phone number or name of the caller (e.g., obtained through caller id), and the phone number or name of the parker (which may or may not be the same as the caller). This information may also be stored in a database (e.g., database 147) and a pointer or reference to the information provided as input to the parked call notification service 149-2 instead of the actual parked call information itself. The parked call notification service 149-2 can then use the pointer or reference provided as input to retrieve the relevant parked called information from the database. Other parked call information may include a text note that is provided by the parker when parking the call.

In addition to the profile management service 149-1 and the parked call notification service 149-2, other web services 149 may be operate on the auxiliary server 142 such as, for example, a service that provides a listing of currently parked calls.

It should be appreciated that the auxiliary server 142 is only one example of an auxiliary server 142, and that the auxiliary server 142 may have more or fewer components than shown, may combine two or more components, or may have a different configuration or arrangement of the components.

Communications Endpoint Device

Figure 3:
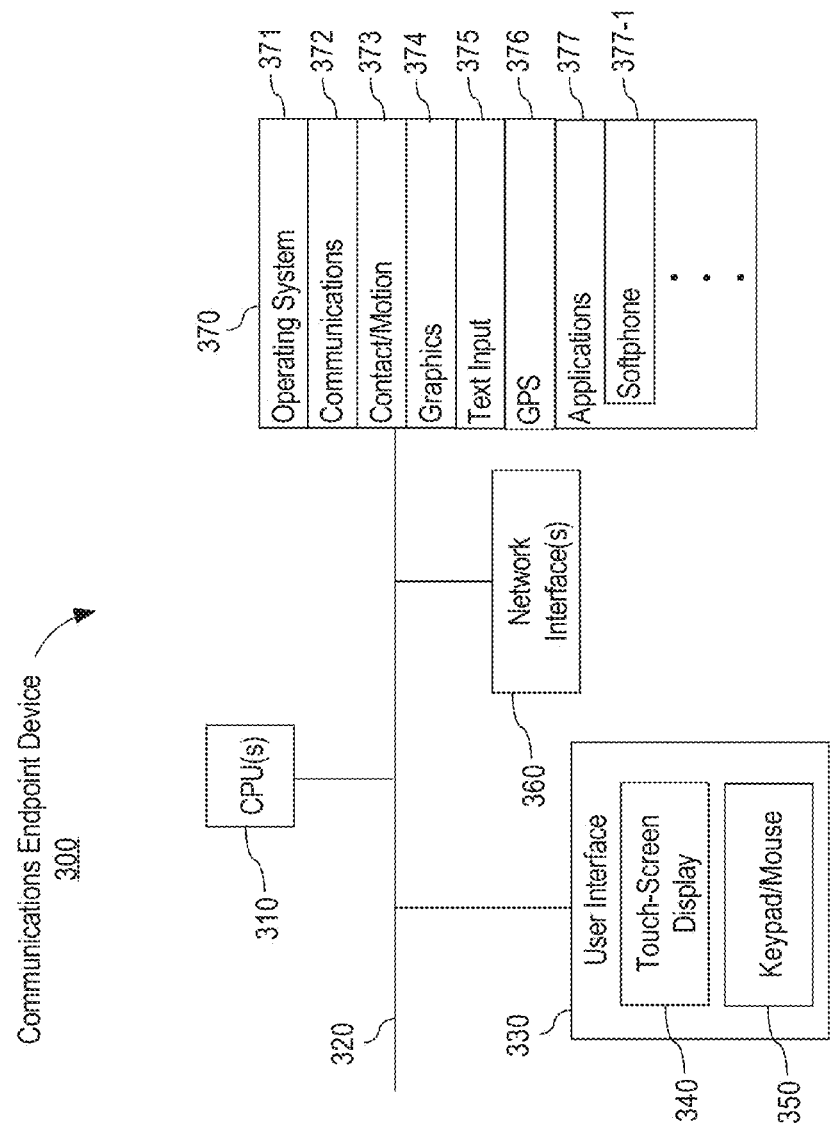
FIG. 3 is a block diagram illustrating a communications endpoint device with a touch screen display in accordance with some embodiments.

FIG. 3 is a block diagram illustrating a communication endpoint device 300 with a touch screen display in accordance with some embodiments. The device 300 corresponds to communications endpoint device 134 or 136 of FIG. 1. A user of the device 300 may interface with the touch screen display to interact with a softphone application that executes on the device 300 and drives user interfaces presented on the touch screen display. Example touch-screen user interfaces are described below. Device 300 may or may not be portable. The device 300 includes one or more processing units (CPU's) 310, one or more network or other communications interfaces 360, memory 370, and one or more communication buses 320 for interconnecting components of the device 300. The communication buses 320 may include circuitry (sometimes called a chipset) that interconnects and controls communications between device components. The device 300 includes a user interface 330 comprising a touch-screen display 340. The user interface 330 also may include a keyboard and/or mouse (or other point device) 350. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices.

In some embodiments, the software components stored in memory 370 may include an operating system 371, a communications module (or set of instructions) 372, a contact/motion module (or set of instructions) 373, a graphics module (or set of instructions) 374, a text input module (or set of instructions) 375, a Global Positioning System (GPS) module (or set of instructions) 376, and applications (or sets of instructions) 377 including a softphone application (or set of instructions) 377-1.

The operating system 371 (e.g., LINUX, UNIX, WINDOWS) includes various software components and/or drivers for controlling and managing general system tasks (e.g., memory management, storage device control, power management, etc.) and facilitates communication between various hardware and software components.

The communication module 372 facilitates communication with other devices such as servers 112 and 142 and also includes various software components for handling data received from other devices.

The contact/motion module 373 may detect contact with the touch screen display 340 (in conjunction with a display controller). The contact/motion module 373 includes various software components for performing various operations related to detection of contact, such as determining if contact has occurred, determining if there is movement of the contact and tracking the movement across the touch screen display 340, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts).

The graphics module 374 includes various known software components for rendering and displaying graphics on the touch screen display 340. As used herein, the term "graphics" includes any object that can be displayed to a user, including without limitation text, web pages, icons (such as user-interface objects including soft keys), digital images, videos, animations and the like.

The text input module 374, which may be a component of graphics module 374, provides soft keyboards for entering text in various applications including softphone application 377-1.

The GPS module 376 determines the location of the device and provides this information for use in various applications. For example, softphone application 377-1 may provide GPS information to auxiliary server 142 for implementing location-dependent call notification preferences.

The softphone application 377-1 allows a user of the device to make calls from the device, receive calls at the device, and park calls, among other operations. The software application 377-1 drives a graphical user interface presented on the touch-screen display 340. The user of the device may interface with the softphone application 377-1 through the touch-screen display 340 and the graphical user interface. Exemplary graphical user interfaces of the softphone application 377-1 are described below.

It should be appreciated that the device 300 is only one example of a communications endpoint device and that the device 300 may have more or fewer components than shown, may combine two or more components, or may have a different configuration or arrangement of the components.

Call Parking Process

Figure 4:
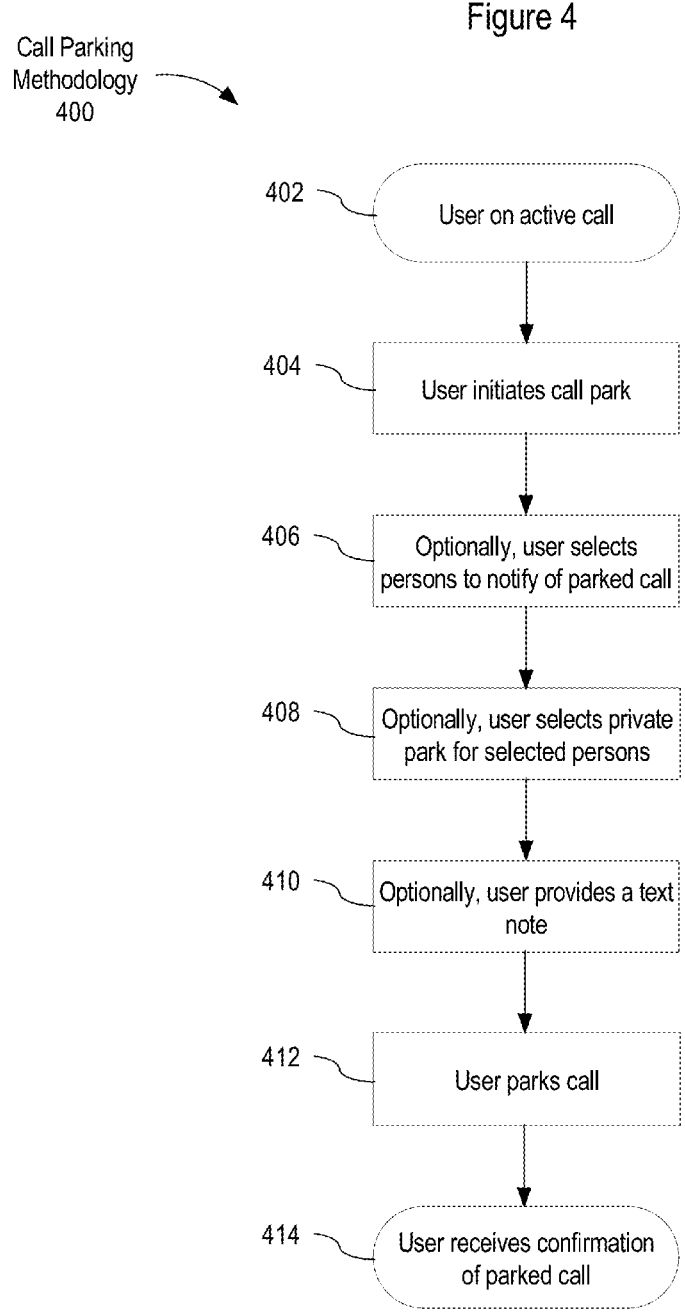
FIG. 4 is a flow diagram of a methodology for call parking from the perspective of a user of a communications endpoint device in accordance with some embodiments.

FIG. 4 is a flow diagram of a methodology 400 for call parking from the perspective of a user of a communications endpoint device in accordance with some embodiments. Although depicted in a certain serial order in FIG. 4, steps of the methodology may be performed in a different order than is shown or performed concurrently.

Initially (402), the user is on an active call with one or more other call participants. From the perspective of the phone system, this means that the phone system is bridging call media information received from the user's communications endpoint device and call media information received from the other participants' communications endpoint devices.

Figure 6:
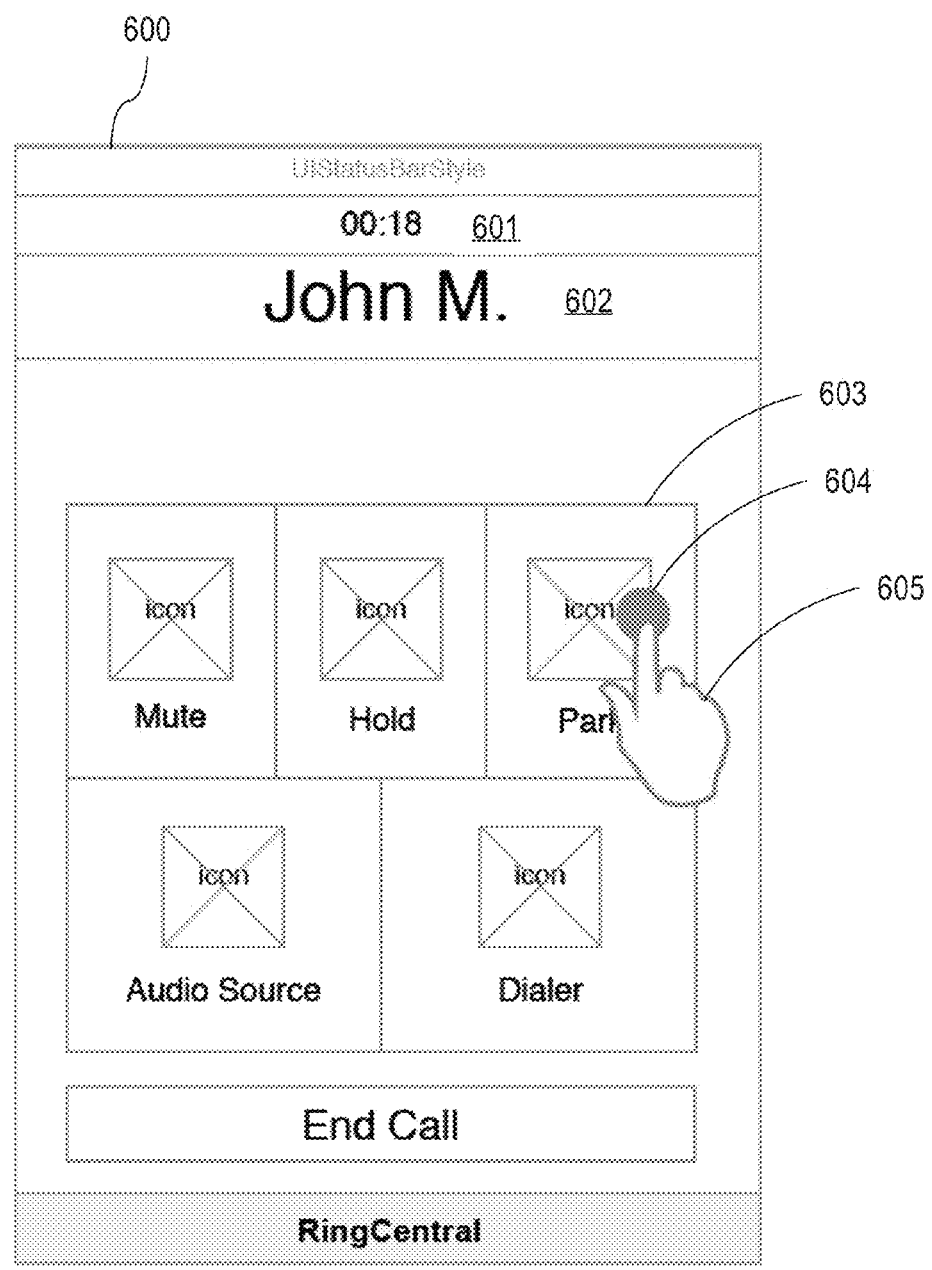
FIG. 6 depicts an example graphical user interface that may be presented on a touch-screen display of a user's communications endpoint device in accordance with some embodiments of the invention.

Next, the user decides to park the active call and initiates (404) a call park from the user's communications endpoint device. In one embodiment, initiating a call park is accomplished by the user touching a certain area of a graphical user interface presented on the touch-screen display of the user's communications endpoint device. For example, FIG. 6 depicts an example graphical user interface 600 that may be driven by a softphone application of the user's communications endpoint device and displayed on a touch-screen display of the user's communications endpoint device. The graphical user interface 600 provides an indication 601 of the current time length of the active call and an indication 602 of the user's name. The graphical user interface also provides a number of touchable areas including touchable call park area 603 corresponding to various active call management operations that the user can perform. Including initiating a call park of the active call, the user can mute the active call, place the active call on hold, select a different audio source for the active call (e.g., a Bluetooth-capable microphone), and present the dialer graphical user interface. In the example of FIG. 6, the user has selected to initiate a park of the active call by touching the call park area 603 at touch point 604 with the user's right hand 605.

In one embodiment, initiating (404) a park of an active call does not actually park the call. Instead, it provides the user an opportunity to select persons to notify, provide a note, and/or designate the park as a private park as described below with respect to steps 406, 408, and 410. However, upon initiating (404) a park of an active call, the softphone application may mute the active call so that the user does not hear and/or see call media information sent from the other participant's communications endpoint devices and so that the other participants do not hear and/see call media information sent from the user's communications endpoint device. This mute operation may not involve any network communication with the phone system or the auxiliary server. Thus, the user's communications endpoint device may still receive call media information from the phone system after initiating (404) a call park. But the softphone application may suppress presentation of such received call media information by the user's communications endpoint device after the call park has been initiated (404).

After initiating (404) a park of an active call, the user may optionally select (406) persons to notify of the parked call. In particular, the user may enter names or other identifiers of persons that the user wishes to notify of the parked call into the graphical user interface driven by the softphone application. Each person selected may correspond to an account profile stored in the database of the auxiliary server. The set of persons from which the user can select from may be based on what account profile group or groups the user is a member of. An account profile group may correspond to a business or organization or some sub-division, branch office, department, etc. thereof. Alternatively, the set of persons from which the user can select from may be from among all account profiles stored in the database of the auxiliary server. The set of persons may be stored in the memory of the user's communications endpoint device as a contact list. The contact list may contain the names of the persons and their associated account profile identifiers. Information stored in the contact list may be downloaded by the user's communications endpoint device from the auxiliary server through the web interface of the auxiliary server. This downloading may be performed by the user's communications endpoint device before the call park is initiated (404) or in response to initiating (404) the call park. As an alternative to storing a contact list at the user's communications endpoint device, a progressive search for persons may be performed whereby as the user enters letters of a person's name into the graphical user interface, those letters are sent to the auxiliary server through the web interface. When an auxiliary server receives a sequence of letters from the communications endpoint device that resolves unambiguously to less than a threshold number of account profiles, then those persons' account names and account profile identifiers are returned to the communications endpoint device. This threshold number account profiles may be reduced further by adding letters to the initial sequence of letters. The further reduction may be performed by the softphone application, thereby avoiding the need to send the additional letters over the network the auxiliary server. As an alternative to the auxiliary server performing the progressive search, the softphone application may perform the entire progressive search against a locally stored contact list, thereby avoiding sending any letters over the network to the auxiliary server.

Figure 7:
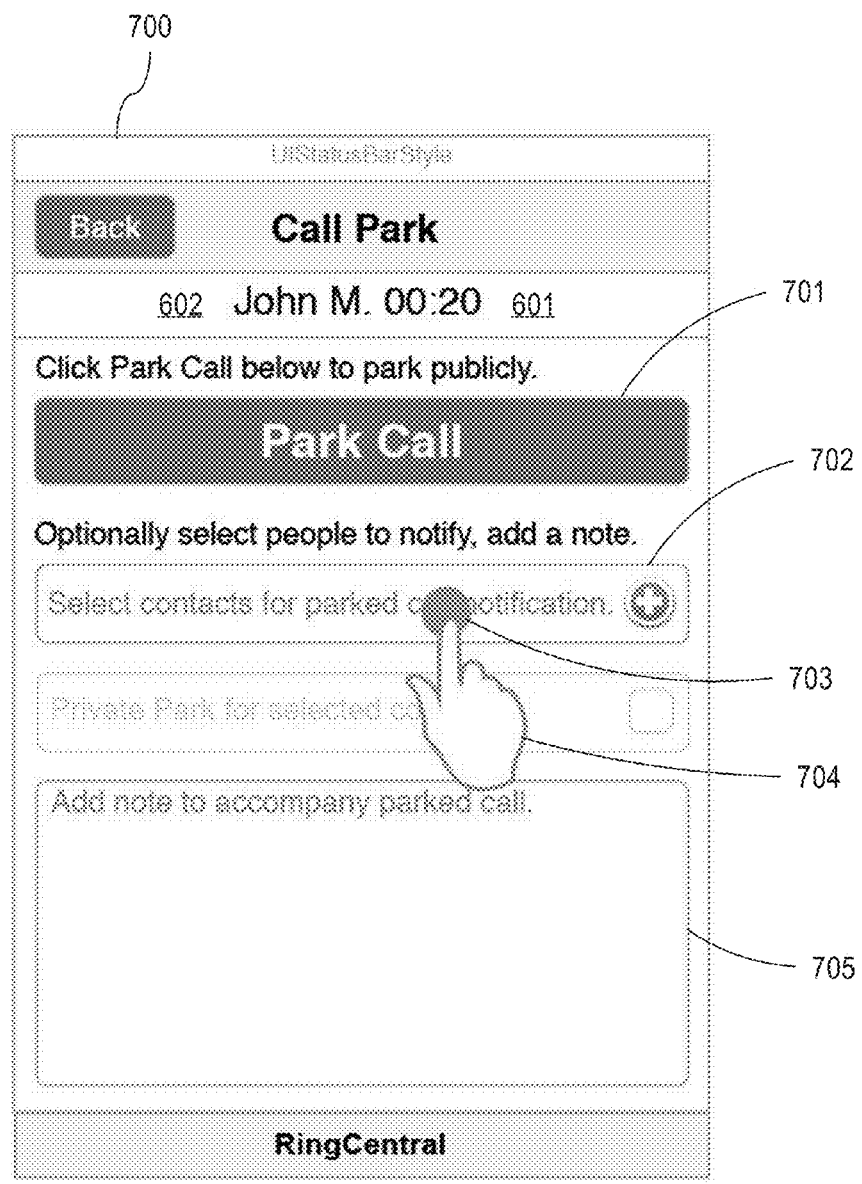
FIG. 7 depicts an example graphical user interface that may be presented on a touch-screen display of a user's communications endpoint device in accordance with some embodiments of the invention.

FIG. 7 depicts an example graphical user interface 700 that may be presented on the touch-screen display of the user's communications endpoint device in accordance with some embodiments of the invention. The interface 700 may be presented after the user initiates (404) a call park or after the user has provided (410) a text note, as examples. The interface 700 includes the active call time and user name indications 601 and 602, respectively. The interface 700 includes a touchable "Park Call" area 701 by which the user can actually park the active call as described below with respect to step 412. If the user does not wish to notify persons of the parked call or add a parked call note, the user may touch the park call area 701 without selecting persons through area 702 or entering a text note in area 705. In this example, the user wishes to select persons to notify of the parked call. Accordingly, the user has selected to initiate the selection of persons by touching in area 702 at touch point 704 with the user's right hand 704.

Figure 8:
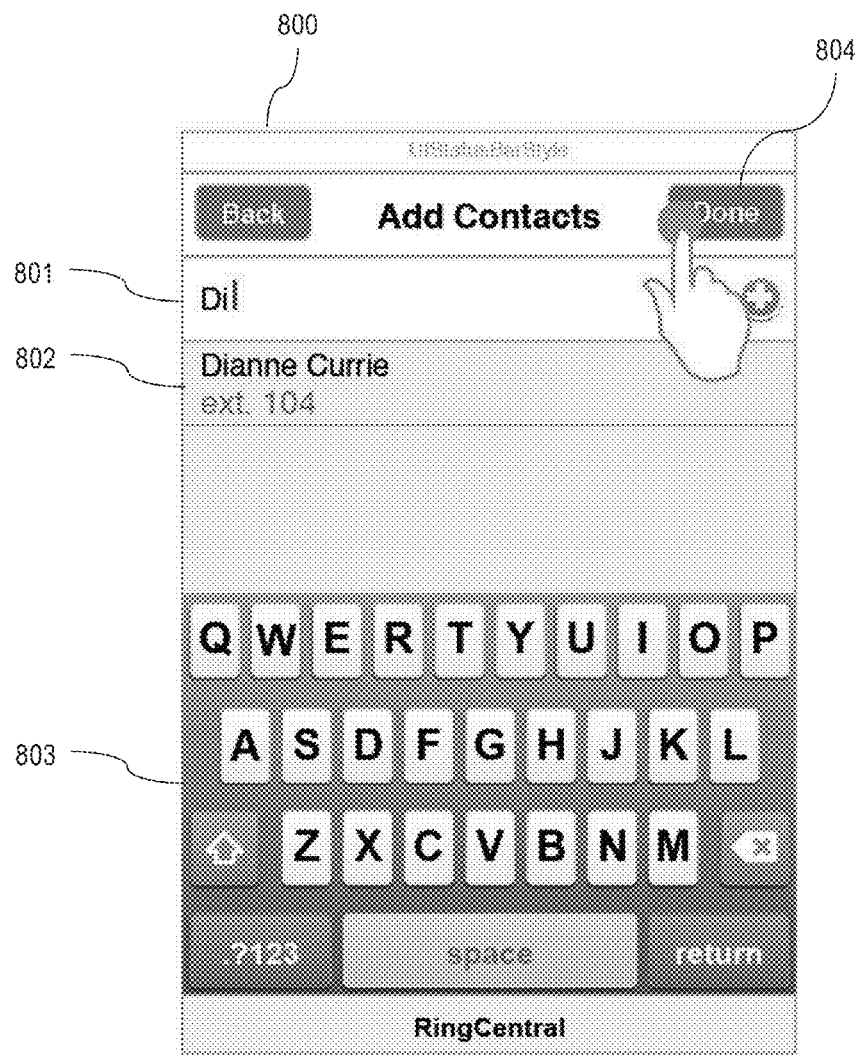
FIG. 8 depicts an example graphical user interface that may be presented on a touch-screen display of a user's communications endpoint device in accordance with some embodiments of the invention.

FIG. 8 depicts an example graphical user interface 800 that may be presented on the touch-screen display of the user's communications endpoint device in accordance with some embodiments of the invention. The interface 800 may be presented after the user touches area 702 of interface 700, for example. The interface 800 allows the user to select a person to notify of the parked call by a progressive search based on the person's name. The interface 800 provides a text area 801 displaying entered letters and a touchable keypad 803 for selecting the letters to enter. In this example, the user has entered the letter 'D' followed by the letter 'i'. The interface 800 provides a search result area 802 that lists the account profiles with names that satisfy the entered sequence of letters. In this example, only one account profile with the name 'Dianne Currie' matches the entered letter sequence 'Di'. Recall the set of account profiles from which the user can select from may be based on what account profile group or groups the user is a member of. Accordingly, the set of possible account profiles that can satisfy an entered letter sequence may be limited by what account profile group or groups the user is a member of. Once the user has identified the account profile of interest, the user may select the account profile as one to notify of the parked call by touching the "Done" area 804 as shown in this example. Alternatively, the user could select an account profile by touching the area of the account profile listing in the search result area 802.

Figure 9:
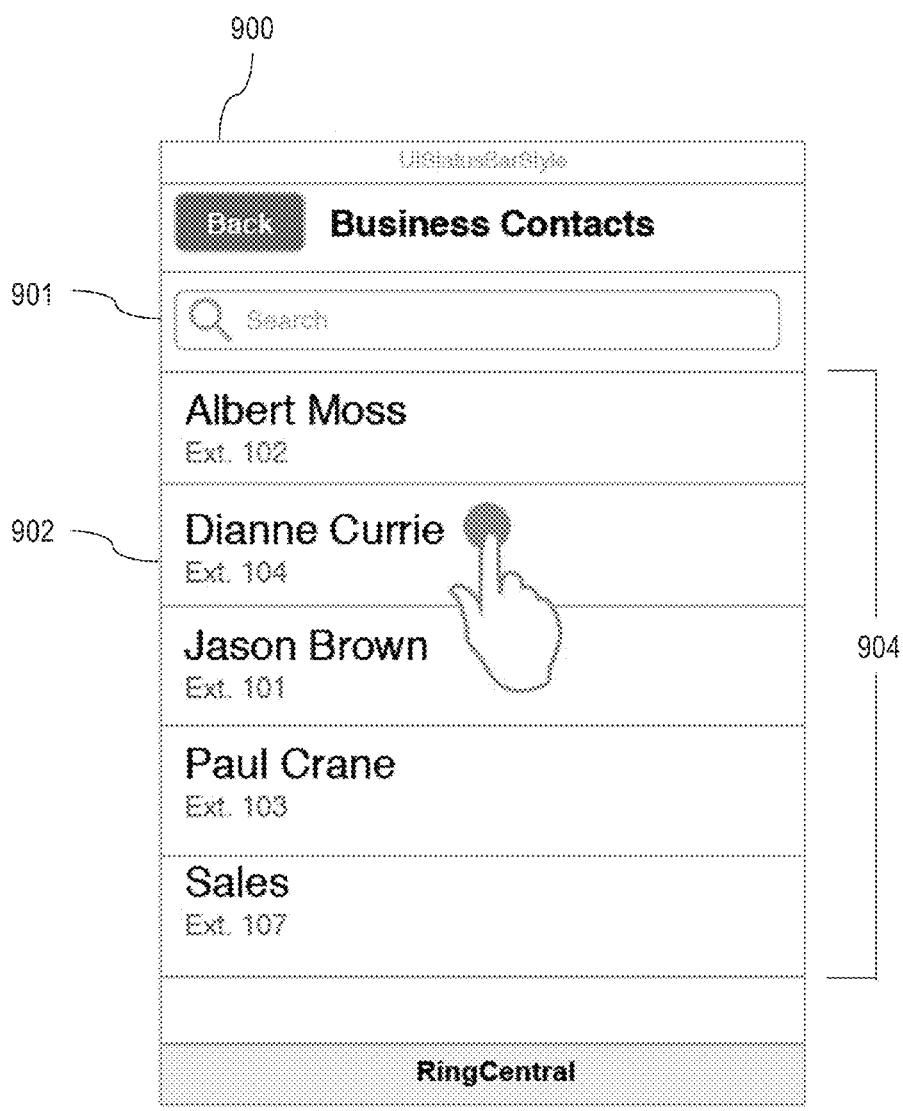
FIG. 9 depicts an example graphical user interface that may be presented on a touch-screen display of a user's communications endpoint device in accordance with some embodiments of the invention.

FIG. 9 depicts an example graphical user interface 900 that may be presented on the touch-screen display of the user's communications endpoint device in accordance with some embodiments of the invention. The interface 900 may be presented after the user touches area 702 of interface 700 as an alternative to presenting the interface 800, for example. In interface 900, initially, all possible account profiles that the user can select from are presented in scrollable list area 904. Once again, the possible account profile that the user can select from may be based on which account profile groups the user is a member of. The list area 904 may be scrolled with touch gestures directed to the touch-screen display, such as with a primarily vertically oriented flick gesture, to reveal account profile listings that are not currently displayed in the list area 904. The interface 900 also provides a progressive search area 901 allowing the user to narrow the account profiles made available for selection in the list area 904 according to a sequence of one or more letters entered into the search area 901 using a touchable keypad (not shown). The user can select an account profile to notify of the parked call by selecting the corresponding account profile listing in the scrollable list area 904. In this example, the user selects the account profile with the name "Dianne Currie" corresponding to account profile listing 902.

According to one embodiment, the user can optionally select (408) through the graphical user interface of the softphone application that the parked call is to be parked privately for the persons selected to receive notification of the parked call. This means that when an attempt to unpark the privately parked call is made, the person attempting to unpark the privately parked call is authenticated to authorize that person to unpark the privately parked call. If the person attempting to unpark the privately parked call is not one of the persons selected by the user to receive notification of the privately parked call, then that person is not authorized to unpark the privately parked call.

The phone system may authenticate an attempted unpark of a privately parked call based on the identity of the communications endpoint device that the unpark attempt is originating from and/or the identity of the user of that communications endpoint device. The identity of the communications endpoint device that the unpark attempt is originating from may be determined through caller id, for example. The phone number obtained through caller id can be used as a key to identify the account profile of the user in the auxiliary server database. For this, account profiles stored in the auxiliary server database may store the phone numbers of communications endpoint devices that the corresponding user most frequently uses. The account profile identifier can then be cross-references with the set of account profile identifiers corresponding to the persons selected to receive notification of the privately parked call. The identity of the user attempting to unpark a privately parked call may be established by requiring the user to provide credentials to the phone system or auxiliary server that can be used to authenticate the user. For example, the softphone application can require the user to login with a username and password before the user can attempt to unpark a privately parked call. These are just some ways in which the attempting user and the attempting communications endpoint device can be authenticated and the present invention is not limited to any particular manner for authenticating the attempting user or the attempting communications endpoint device.

Figure 10:
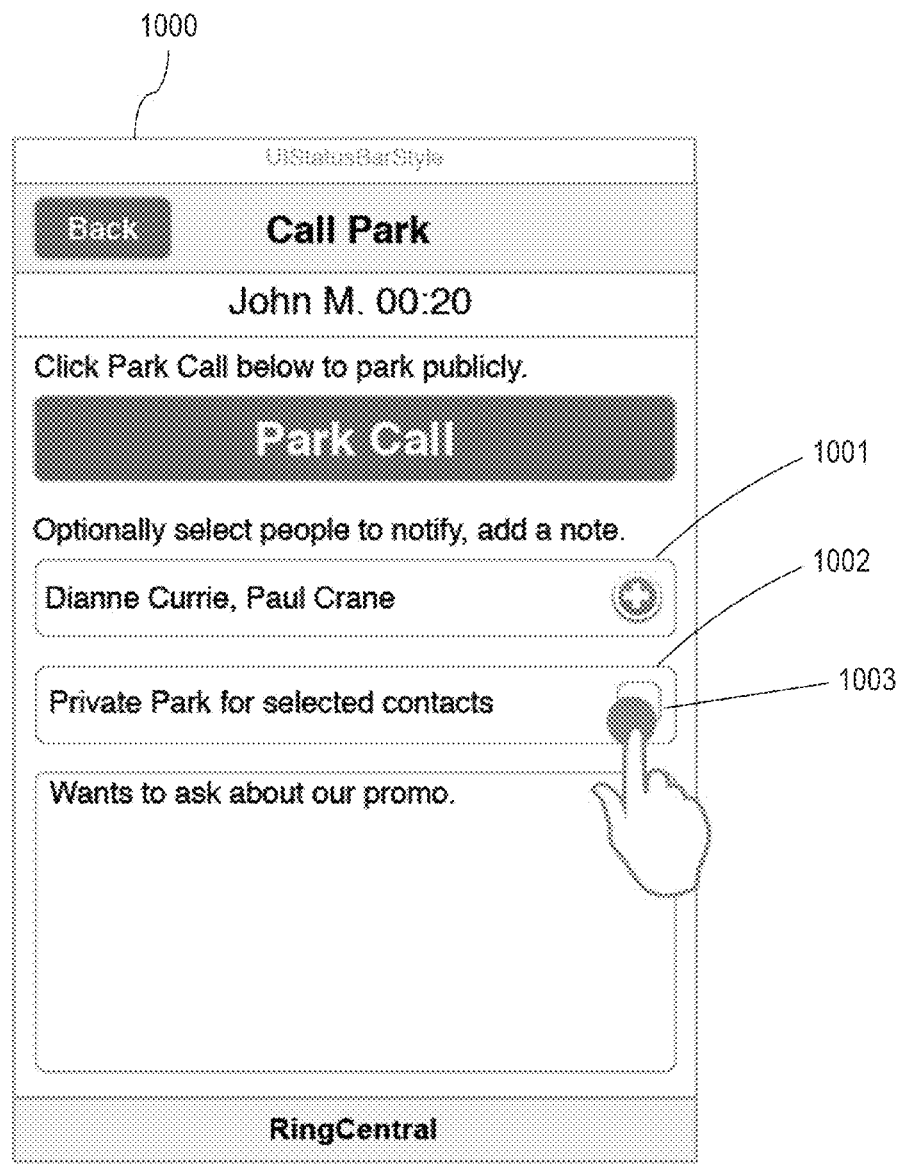
FIG. 10 depicts an example graphical user interface that may be presented on a touch-screen display of a user's communications endpoint device in accordance with some embodiments of the invention.

FIG. 10 depicts an example graphical user interface 1000 that may be presented on the touch-screen display of the user's communications endpoint device in accordance with some embodiments of the invention. The interface 1000 may be presented after the user has selected (406) persons to notify of the parked call or after the user has selected (406) persons to notify of the parked call and provided (410) a text note, as examples. In this example, the user has selected "Dianne Currie" and "Paul Crane" as persons to notify of the parked call as indicated in graphical user interface region 1001. If the user desires to make the parked call as private one, the user may select the checkbox 1002 in the private park designation area 1003 of the graphical user interface 1000.

According to some embodiments, the user may optionally provide (410) a text note through the graphical user interface driven by the softphone application. The text note is included in the notifications to persons selected (406) by the user to receive notification of the parked call. The text note may also be displayed in listings of parked calls such as, for example, a list of currently parked calls generated as part of a web page by the auxiliary server.

Figure 11:
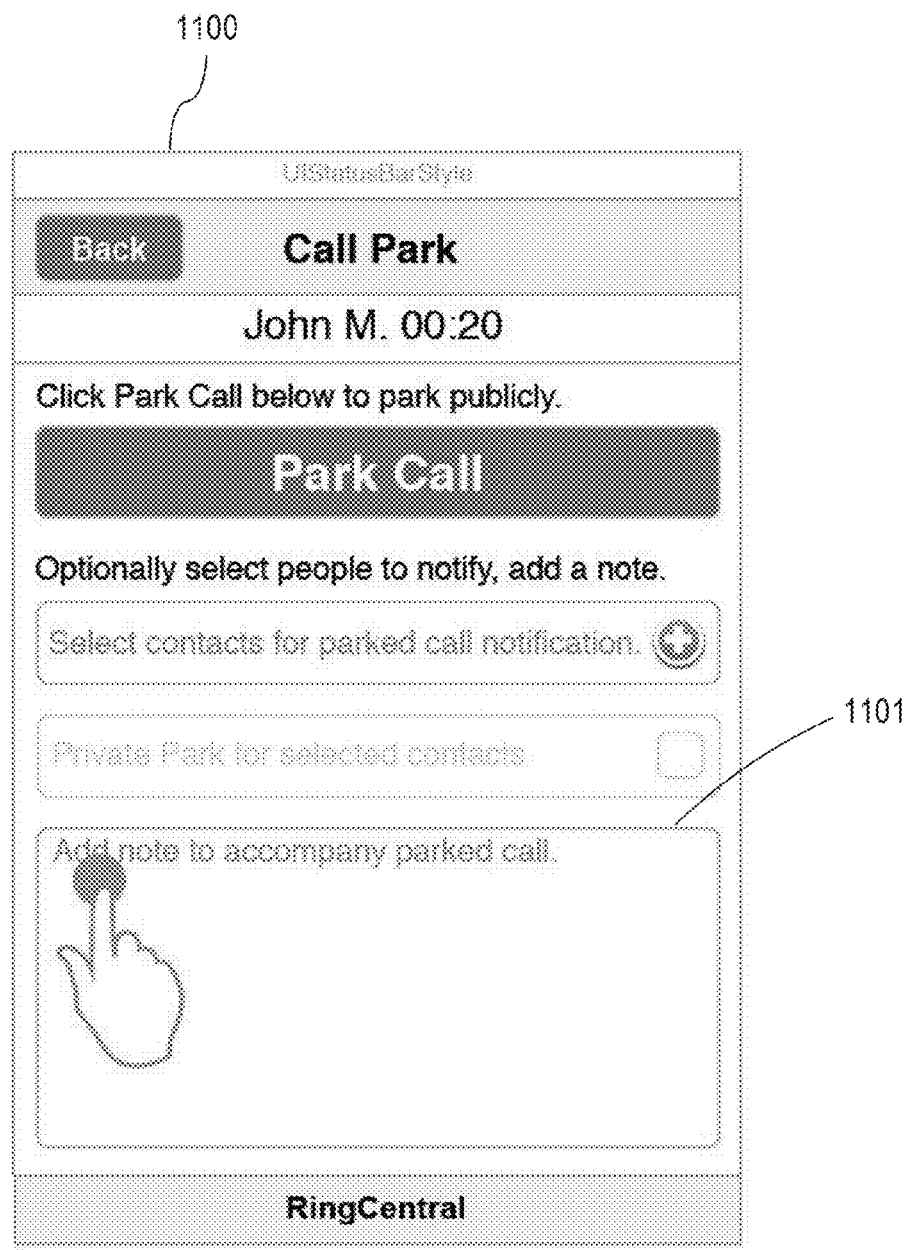
FIG. 11 depicts an example graphical user interface that may be presented on a touch-screen display of a user's communications endpoint device in accordance with some embodiments of the invention.
Figure 12:
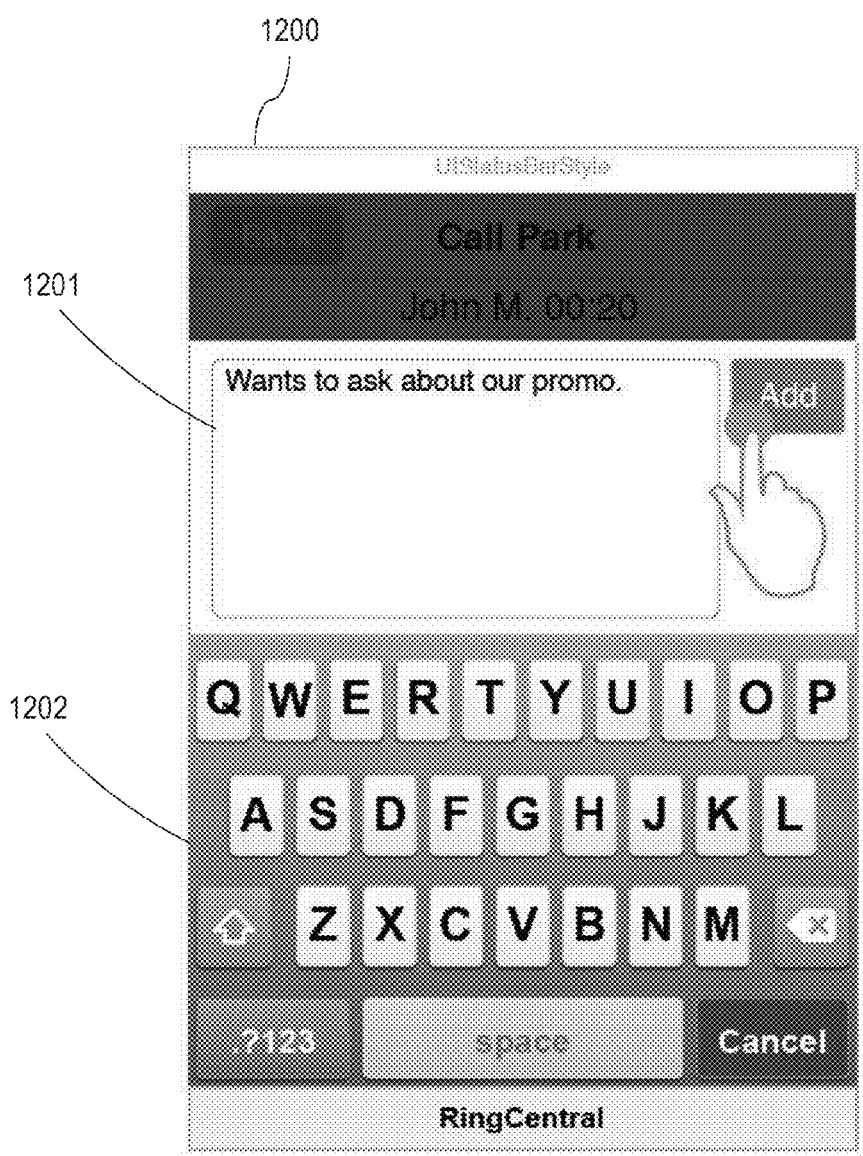
FIG. 12 depicts an example graphical user interface that may be presented on a touch-screen display of a user's communications endpoint device in accordance with some embodiments of the invention.

FIG. 11 depicts an example graphical user interface 1100 that may be presented on the touch-screen display of the user's communications endpoint device in accordance with some embodiments of the invention. The interface 1100 may be presented after the user has initiated (404) a park of an active call, after the user has selected (406) persons to notify of the parked call, or after the user has selected (406) persons to notify of the parked and after selecting (408) the private park option, as examples. The interface 1100 provides a touchable region 1101 for providing a text note. Upon touching the touchable region 1101, a soft-keypad for entering the text note may be displayed on the touch-screen display as shown, for example, in FIG. 12. Here, the user has used the soft-keypad 1201 to enter the text note "Wants to ask about our promo", as shown in text entry region 1202.

After the user has initiated (404) a call park and optionally selected (406) persons to receive notification of the parked call, optionally selected (408) the private park option, and/or optionally provided (410) a text note, the user can actually park (412) the active call through the graphical user interface driven by the softphone application. This results in the softphone application generating and sending a "call park request" to the phone system or the auxiliary server. In some cases where the user has selected persons to notify of the parked call and the call park request is sent to the phone system, parking the call through the graphical user interface also results in a separate "call park notification request" sent to the auxiliary server.

According to one embodiment, when the user has selected persons to notify of the parked call, the call park request is sent over the packet-switched data network to the phone system in one or more VoIP messages. For example, the VoIP messages could be one or more SIP messages. The VoIP messages include the account profile identifiers of the persons selected to receive notification of the parked call. In addition, the VoIP messages may include an indication that the call is to be parked privately, if the user selected (408) the private park option. In addition, the VoIP messages may include the text note, if the user provided (410) a text note. The VoIP messages may also include information identifying the active call to the phone system such as, for example, a call identifier and also information identifying the user and/or communications endpoint device.

In one embodiment, after the phone system has successfully parked the active call and assigned the parked call an orbit, the phone system signals the auxiliary server to send call park notifications to the selected persons. This signal from the phone system includes providing account profile identifiers of the selected persons, the assigned orbit, whether the parked call is parked privately, and any text note. The phone system may make this signal in one or more network messages such as, for example, one or more Hyper Text Transfer Protocol (HTTP) messages. After receiving the signal, the auxiliary server uses the received account profile identifiers to lookup corresponding notification preference information in the auxiliary server database. The auxiliary server uses the notification preference information to generate and send call park notification messages in a manner that accords with the selected persons' notification preferences.

Note that the phone system could signal the auxiliary server after an orbit has been assigned but before the active call is actually parked. In this case, the auxiliary server may queue the call park notifications for sending but not actually send the notifications until a confirmation signal is received from the phone system. After the active call is successfully parked, the phone system may send the confirmation signal to the auxiliary server which, upon receiving the confirmation signal, sends the call park notifications. In this way, the auxiliary server can generate and queue the call park notifications while the phone system is parking the active call.

The format of the call park notification sent by the auxiliary server may vary from selected person to selected person. For example, one selected person may receive an e-mail message while another selected person may receive a SMS text message. In general, however, the call park notification includes the assigned orbit and any provided (410) text note.

In one embodiment, in addition to or instead of generating and sending call parking notifications according to the selected user's notification preferences, the auxiliary server generates and sends "push notifications" to the selected persons' communications endpoint devices through a third-party push notification service. In this embodiment, the selected persons may be required to be running the softphone application on their communications endpoint devices to receive the push notifications. Like the call park notifications, the push notifications may include assigned orbit and any provided (410) text note. Before sending a push notification to a selected person, the auxiliary server may consult that selected person's notification preference information to determine if the selected person wishes to receive push notifications. If the selected person does not wish to receive push notifications, then the auxiliary may not send a push notification to the selected person. Examples of suitable third-party push notification services include Apple's "Push Notification Service" and Google's "Android Cloud to Device Messaging Service".

As an alternative to sending the call parking request to the phone system and having the phone system signal the auxiliary server to send the call parking notifications and push notifications, the softphone application can send the call park request to the auxiliary server. For example, the softphone application can send the call park request to the auxiliary server in one or more HTTP messages. In this case where the softphone application sends the call park request to the auxiliary server, the auxiliary server signals the phone system to park the active call instead of the phone system signaling the auxiliary server to send the call park notifications and push notifications.

As mentioned previously, in some cases where the user has selected persons to notify of the parked call and the call park request is sent to the phone system, parking the call through the graphical user interface also results in a separate "call park notification request" sent to the auxiliary server. In this scenario, the softphone application sends a call park request to the phone system and a call park notification request to the auxiliary server after the softphone application receives confirmation from the phone system that the active call has been successfully parked. This confirmation sent from the phone system and received by the softphone application may include the orbit assigned to the parked call. The assigned orbit is included in the subsequent call park notification request sent to the auxiliary server. In one embodiment, the call park request sent to the phone system and the call park confirmation received from the phone system are sent and received in one or more VoIP network messages such as, for example, one or more SIP network messages. In one embodiment, the call park notification request sent to the auxiliary server is sent in one or more HTTP network messages.

Figure 13:
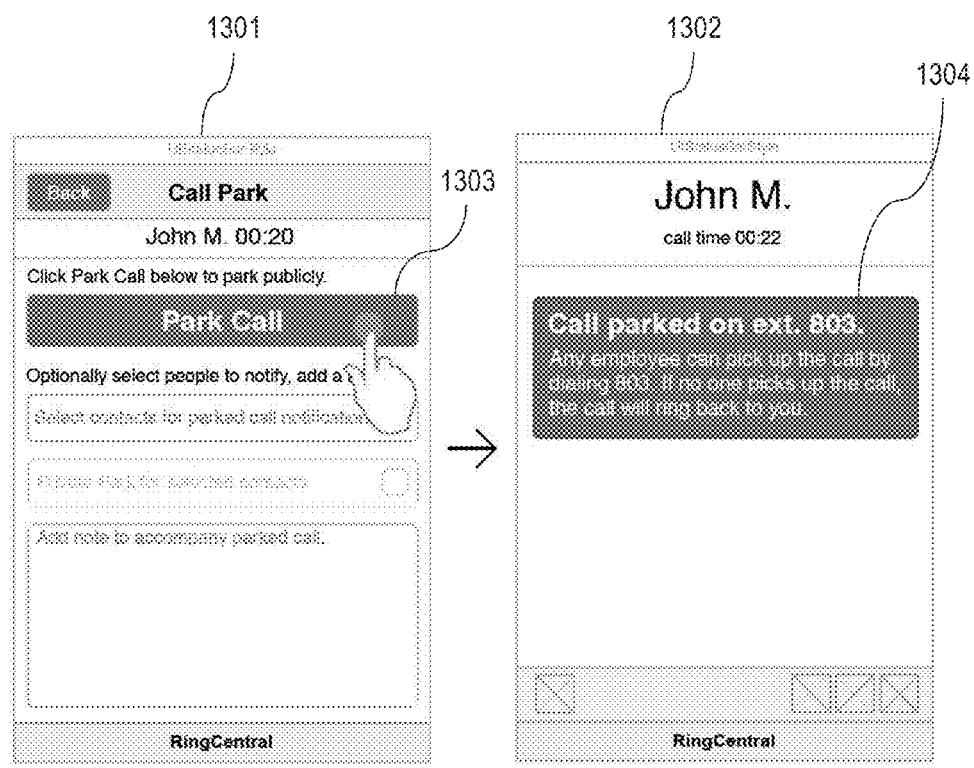
FIG. 13 depicts example graphical user interfaces and that may be presented on the touch-screen display of the user's communications endpoint device in accordance with some embodiments of the invention.

FIG. 13 depicts example graphical user interfaces 1301 and 1302 that may be presented on the touch-screen display of the user's communications endpoint device in accordance with some embodiments of the invention. The interface 1301 may be presented on the touch-screen display after the user has initiated (404) a call park and optionally selected (406) persons to receive notification of the parked call, optionally selected (408) the private park option, and/or optionally provided (410) a text note, as examples. The interface 1301 provides a "Park Call" touchable area 1303 which, when invoked with a touch gesture, causes the graphical user interface of the softphone application to transition to user interface 1302. In addition, the softphone application will send the call park request and/or the call notification request as described above. The resulting interface 1302 includes a confirmation message 1304 indicating that the active call was successfully parked. The confirmation message 1304 includes the orbit assigned to the parked call, in this example, "803". The resulting interface 1302 may be presented after the softphone application receives (414) confirmation of the parked call from the phone system or the auxiliary server depending on which of the two the softphone application sent the call park request to. The received confirmation may include the orbit assigned to the parked call.

Figure 14:
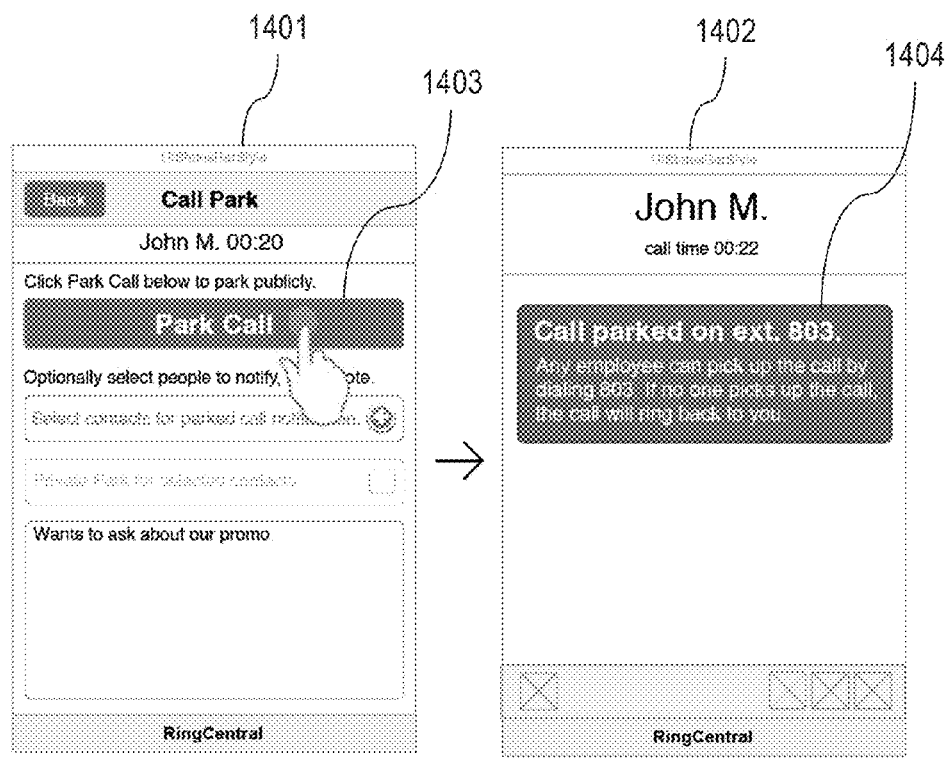
FIG. 14 depicts example graphical user interfaces and that may be presented on the touch-screen display of the user's communications endpoint device in accordance with some embodiments of the invention.

FIG. 14 depicts example graphical user interfaces 1401 and 1402 that may be presented on the touch-screen display of the user's communications endpoint device in accordance with some embodiments of the invention. The interface 1401 may be presented on the touch-screen display after the user has initiated (404) a call park and provided (410) a text note. The user can actually park (412) the active call by invoking the "Park Call" touchable area 1403 of the graphical user interface 1401. The resulting interface 1402 includes a confirmation message 1404 indicating that the active call was successfully parked.

Figure 15:
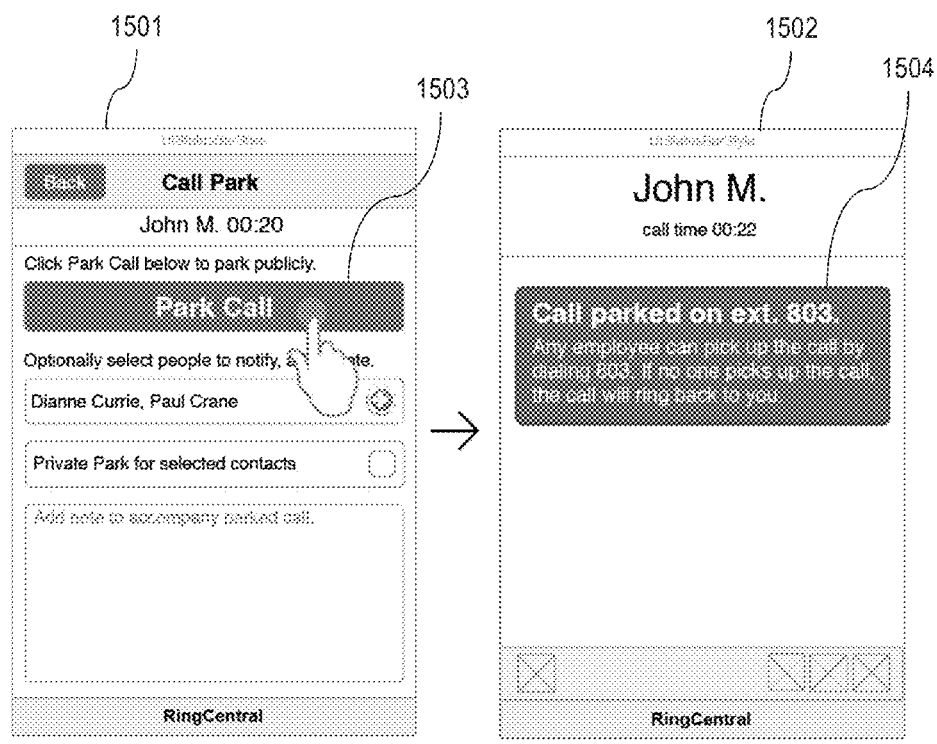

FIG. 15 depicts example graphical user interfaces 1501 and 1502 that may be presented on the touch-screen display of the user's communications endpoint device in accordance with some embodiments of the invention. The interface 1501 may be presented on the touch-screen display after the user has initiated (404) a call park and selected (406) persons to notify of the parked call. The user can actually park (412) the active call by invoking the "Park Call" touchable area 1503 of the graphical user interface 1501. The resulting interface 1502 includes a confirmation message 1504 indicating that the active call was successfully parked.

Figure 16:
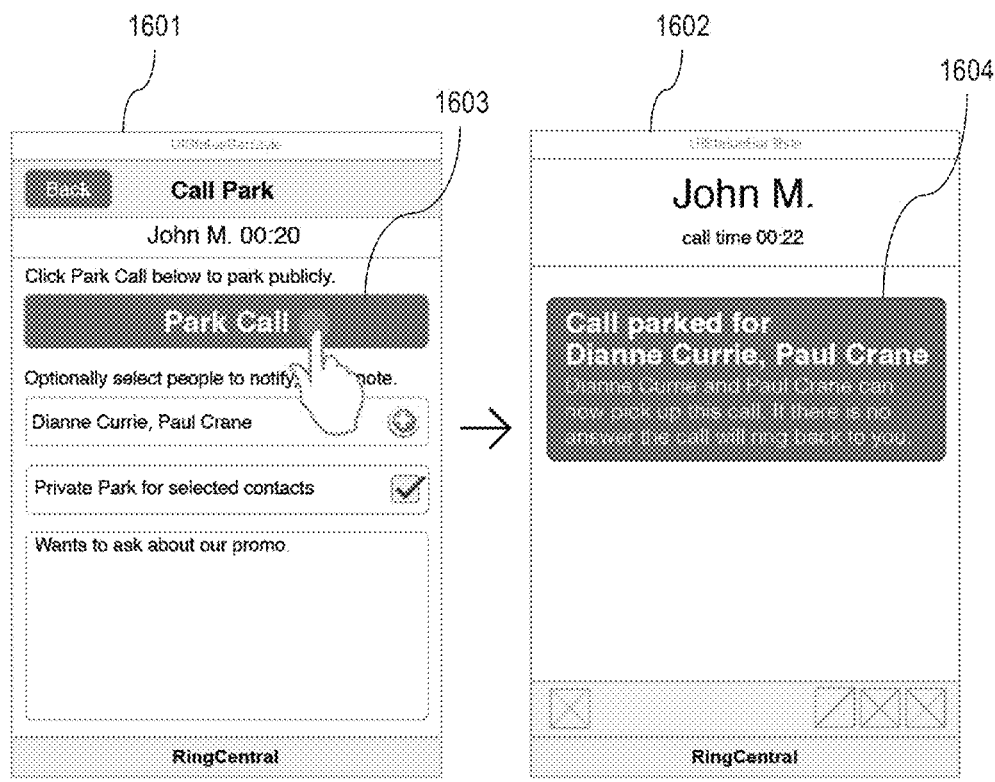
FIG. 16 depicts example graphical user interfaces and that may be presented on the touch-screen display of the user's communications endpoint device in accordance with some embodiments of the invention.

FIG. 16 depicts example graphical user interfaces 1601 and 1602 that may be presented on the touch-screen display of the user's communications endpoint device in accordance with some embodiments of the invention. The interface 1601 may be presented on the touch-screen display after the user has initiated (404) a call park, selected (406) persons to notify of the parked call, selected (408) the private park option, and provided (410) a text note. The user can actually park (412) the active call by invoking the "Park Call" touchable area 1603 of the graphical user interface 1501. The resulting interface 1602 includes a confirmation message 1604 indicating that the active call was successfully parked. In this example, the confirmation message includes the names of the selected persons that the call was parked privately for instead of the assigned orbit.

Call Unparking Process

Figure 5:
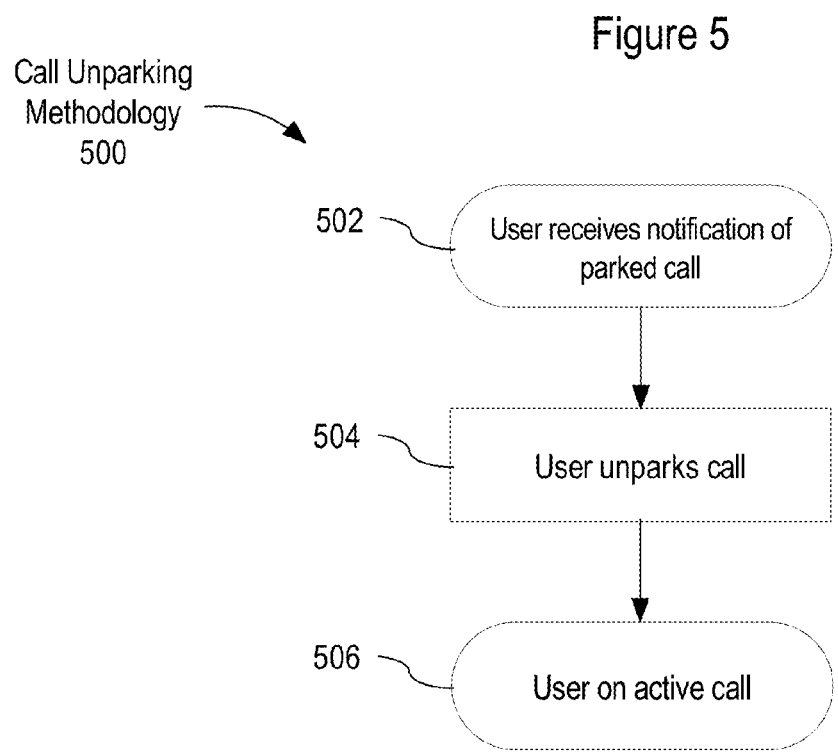
FIG. 5 is a flow diagram of a methodology for call parking from the perspective of a user of a communications endpoint device in accordance with some embodiments.

FIG. 5 is a flow diagram of a methodology 500 for unparking a parked call from the perspective of a user of a communications endpoint device in accordance with some embodiments. Although depicted in a certain serial order in FIG. 5, steps of the methodology may be performed in a different order than is shown or performed concurrently.

Initially, the user receives (502) notification of a parked call. The user receives (502) the notification in accordance with his or her notification preferences as stored in the user's account profile in the auxiliary server database. The notification may, for example, be received in an e-mail message, a SMS text message, or a push notification to the softphone application of the user's communications endpoint device. The notification received by the user may indicate that a call is parked, what orbit the call is parked at, whether the call is parked privately for the user, and any text note provided by the parker, among other possible information.

Next, the user unparks (504) the parked call through the graphical user interface of the softphone application executing on the user's communications endpoint device. Unparking (504) the call results in the softphone application sending a call unpark request to the phone system or the auxiliary server. The call unpark request may include the assigned orbit, among other information. The assigned orbit may be received (502) in the notification of the parked call. The phone system or the auxiliary server receiving the unpark request may authenticate and authorize the user and/or the user's communications endpoint device as described above, if the request is to unpark a privately parked call. If the call is not privately parked or if the user is authorized to unpark the privately parked call, then the call is unparked and the call is resumed (506) as an active call with the user as a participant and the user's communications endpoint device connected on the active call. If the auxiliary server receives the call unpark request, the auxiliary server may signal the phone system to unpark the call and resume the parked call as an active call with the user as a participant and the user's communications endpoint device connected on the active call. A call unpark request sent to the phone system may be sent in one or more VoIP messages (e.g., one or more SIP messages). A call unpark request sent to the auxiliary server may be sent in one or more HTTP messages, as just one example.

Figure 17:
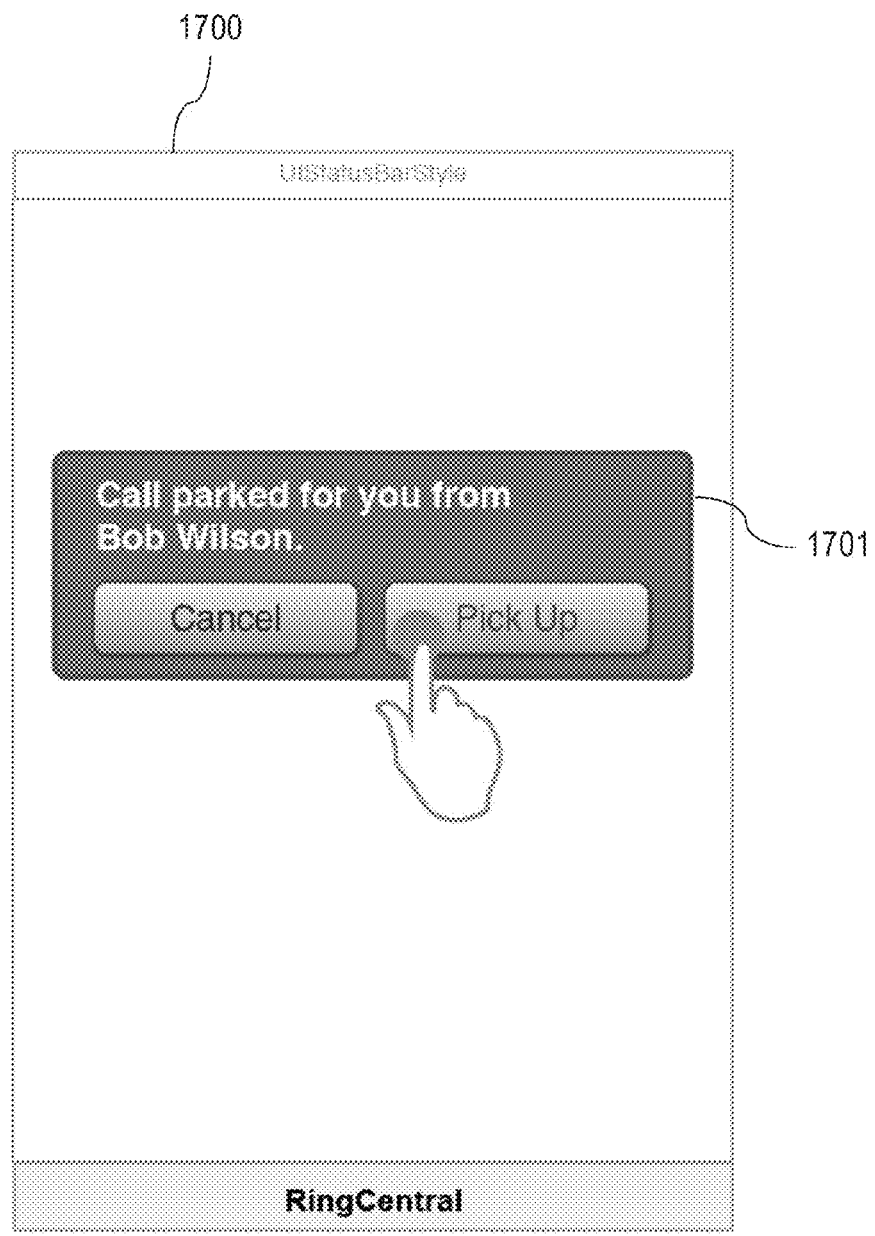
FIG. 17 depicts an example graphical user interface that may be presented on a touch-screen display of a user's communications endpoint device in accordance with some embodiments of the invention.

FIG. 17 depicts an example graphical user interface 1700 that may be presented on the touch-screen display of the user's communications endpoint device in accordance with some embodiments of the invention. The interface 1700 may be presented in response to the softphone application receiving a push notification of a privately parked call from a third-party push notification service. The interface 1700 includes a parked call notification user interface dialog 1701 providing the user the choice of ignoring the parked call notification or unparking the parked call. In this example, the user has selected to unpark the privately parked call.

Figure 18:
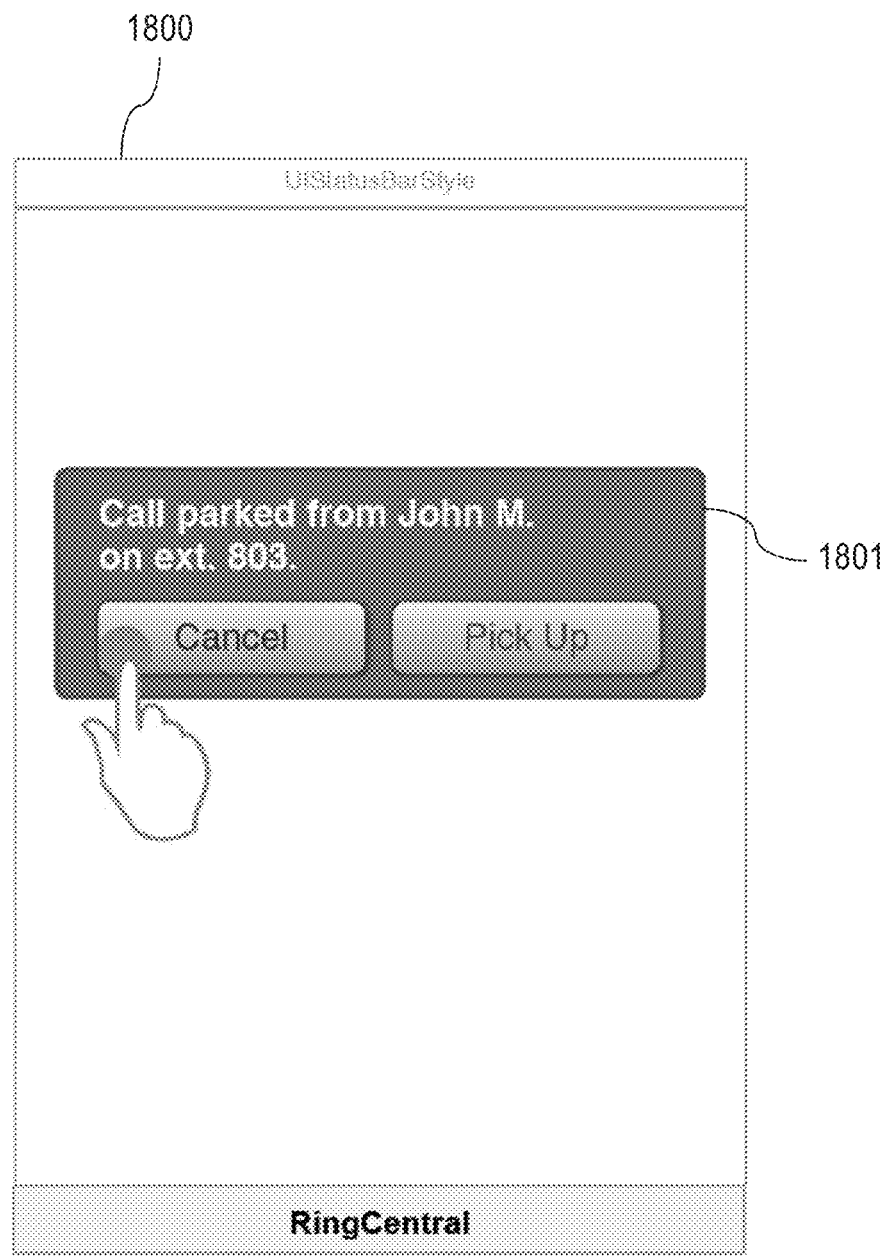
FIG. 18 depicts an example graphical user interface that may be presented on a touch-screen display of a user's communications endpoint device in accordance with some embodiments of the invention.

FIG. 18 depicts an example graphical user interface 1800 that may be presented on the touch-screen display of the user's communications endpoint device in accordance with some embodiments of the invention. The interface 1800 may be presented in response to the softphone application receiving a push notification of a publicly parked call from a third-party push notification service. The interface 1800 includes a parked call notification user interface dialog 1801 providing the user the choice of ignoring the parked call notification or unparking the parked call. In this example, the user has selected to ignore the publicly parked call.

Figure 19:
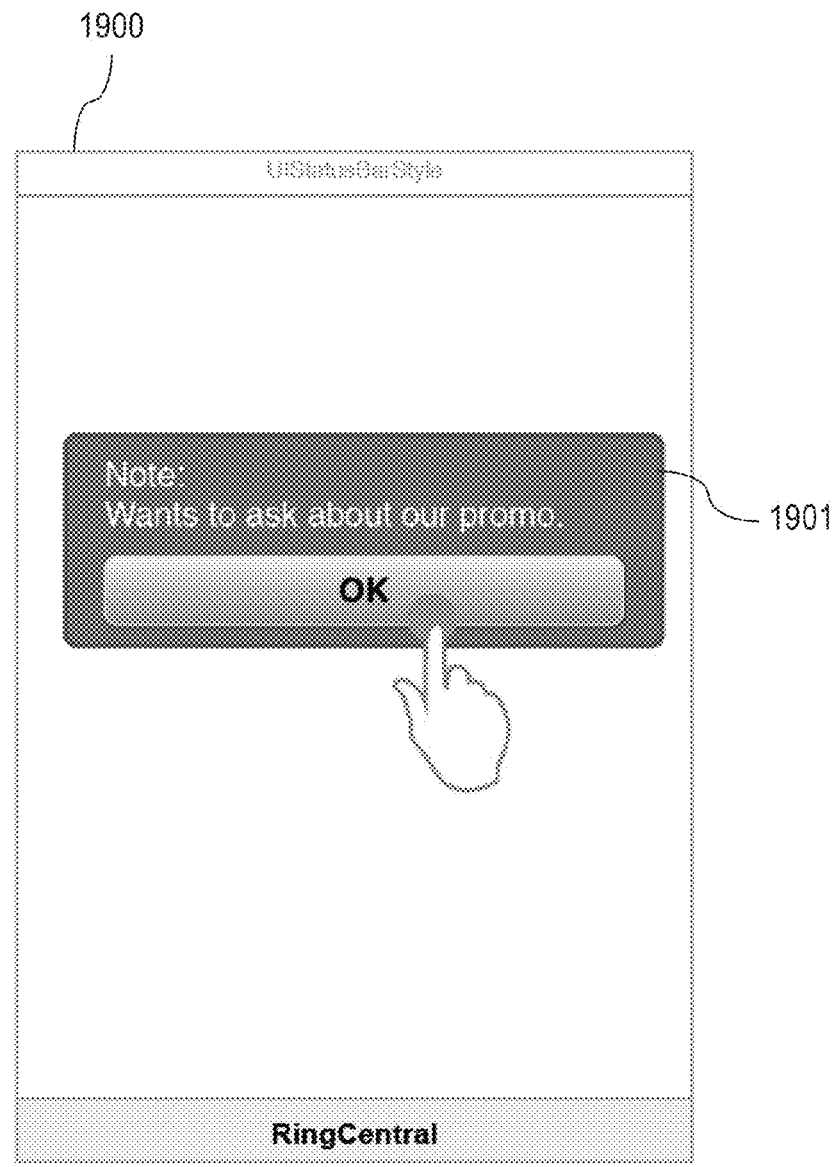
FIG. 19 depicts an example graphical user interface that may be presented on a touch-screen display of a user's communications endpoint device in accordance with some embodiments of the invention.

According to one embodiment, if the user selects the choice of unparking the parked call and the parked call is associated with a text note provided (410) by the parker of the parked call, then the softphone application may display the text note on touch-screen display as depicted by the example graphical user interface 1900 of FIG. 19. The interface 1900 includes a text note dialog 1901 which, when activated by a touch gesture, actually unparks (504) the parked call. The dialog 1901 includes the text note provide (410) by the parker of the parked call.

Special-Purpose Computing Device

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 20:
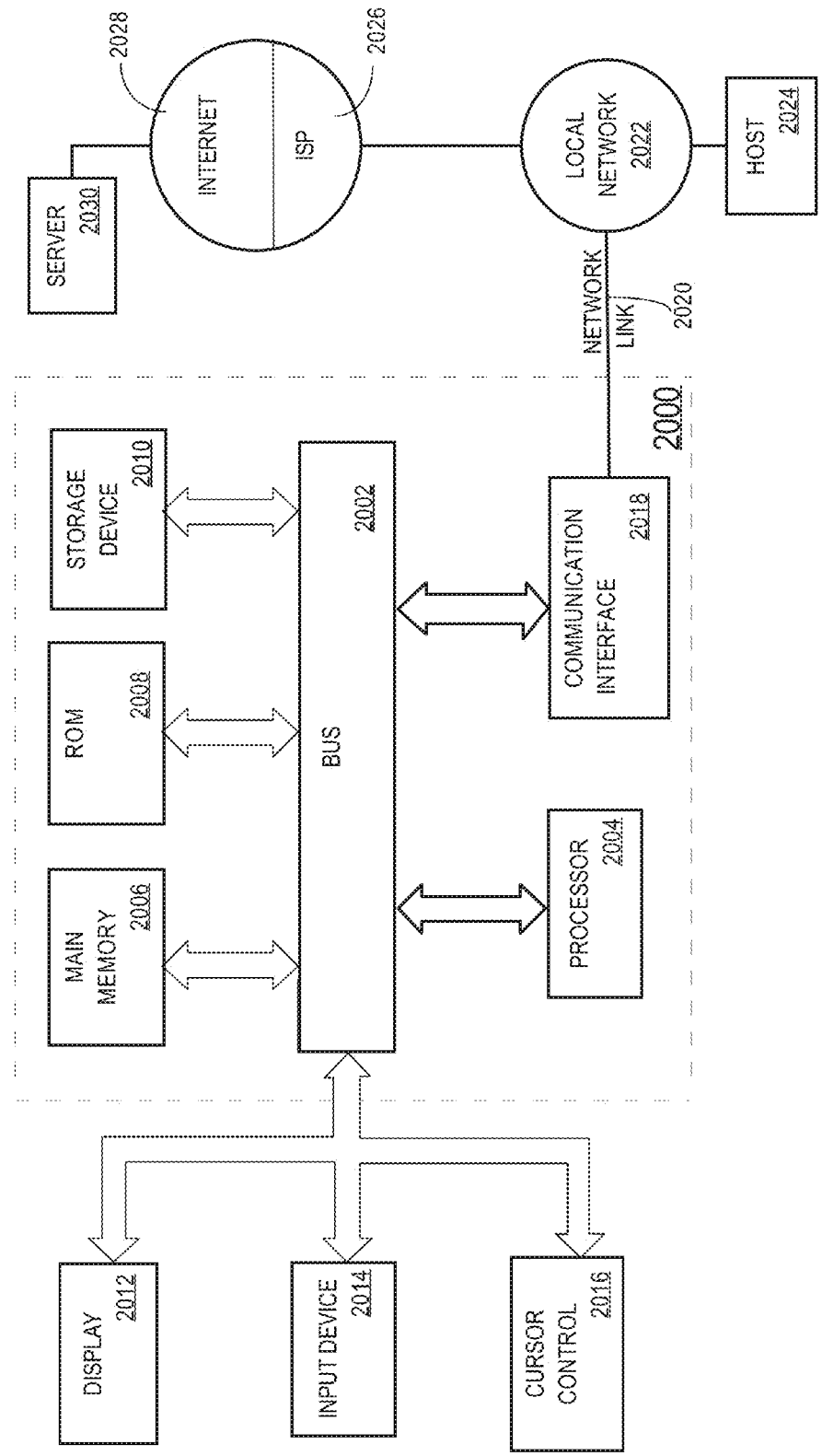
FIG. 20 is a block diagram of a computer system on which embodiments of the invention may be implemented.

For example, FIG. 20 is a block diagram that illustrates a computer system 2000 upon which an embodiment of the invention may be implemented. Computer system 2000 includes a bus 2002 or other communication mechanism for communicating information, and a hardware processor 2004 coupled with bus 2002 for processing information. Hardware processor 2004 may be, for example, a general purpose microprocessor.

Computer system 2000 also includes a main memory 2006, such as a random access memory (RAM) or other dynamic storage device, coupled to bus 2002 for storing information and instructions to be executed by processor 2004. Main memory 2006 also may be used for storing temporary variables or other intermediate information during execution of instructions to be executed by processor 2004. Such instructions, when stored in non-transitory storage media accessible to processor 2004, render computer system 2000 into a special-purpose machine that is customized to perform the operations specified in the instructions.

Computer system 2000 further includes a read only memory (ROM) 2008 or other static storage device coupled to bus 2002 for storing static information and instructions for processor 2004. A storage device 2010, such as a magnetic disk, optical disk, or solid-state drive is provided and coupled to bus 2002 for storing information and instructions.

Computer system 2000 may be coupled via bus 2002 to a display 2012, such as a cathode ray tube (CRT), for displaying information to a computer user. An input device 2014, including alphanumeric and other keys, is coupled to bus 2002 for communicating information and command selections to processor 2004. Another type of user input device is cursor control 2016, such as a mouse, a trackball, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane.

Computer system 2000 may implement the techniques described herein using customized hard-wired logic, one or more ASICs or FPGAs, firmware and/or program logic which in combination with the computer system causes or programs computer system 2000 to be a special-purpose machine. According to one embodiment, the techniques herein are performed by computer system 2000 in response to processor 2004 executing one or more sequences of one or more instructions contained in main memory 2006. Such instructions may be read into main memory 2006 from another storage medium, such as storage device 2010. Execution of the sequences of instructions contained in main memory 2006 causes processor 2004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 2010. Volatile media includes dynamic memory, such as main memory 2006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2002. Transmission media can also take the form of acoustic or light waves, such as those generated during radio-wave and infra-red data communications.

Various forms of media may be involved in carrying one or more sequences of one or more instructions to processor 2004 for execution. For example, the instructions may initially be carried on a magnetic disk or solid-state drive of a remote computer. The remote computer can load the instructions into its dynamic memory and send the instructions over a telephone line using a modem. A modem local to computer system 2000 can receive the data on the telephone line and use an infra-red transmitter to convert the data to an infra-red signal. An infra-red detector can receive the data carried in the infra-red signal and appropriate circuitry can place the data on bus 2002. Bus 2002 carries the data to main memory 2006, from which processor 2004 retrieves and executes the instructions. The instructions received by main memory 2006 may optionally be stored on storage device 2010 either before or after execution by processor 2004.

Computer system 2000 also includes a communication interface 2018 coupled to bus 2002. Communication interface 2018 provides a two-way data communication coupling to a network link 2020 that is connected to a local network 2022. For example, communication interface 2018 may be an integrated services digital network (ISDN) card, cable modem, satellite modem, or a modem to provide a data communication connection to a corresponding type of telephone line. As another example, communication interface 2018 may be a local area network (LAN) card to provide a data communication connection to a compatible LAN. Wireless links may also be implemented. In any such implementation, communication interface 2018 sends and receives electrical, electromagnetic or optical signals that carry digital data streams representing various types of information.

Network link 2020 typically provides data communication through one or more networks to other data devices. For example, network link 2020 may provide a connection through local network 2022 to a host computer 2024 or to data equipment operated by an Internet Service Provider (ISP) 2026. ISP 2026 in turn provides data communication services through the world wide packet data communication network now commonly referred to as the "Internet" 2028. Local network 2022 and Internet 2028 both use electrical, electromagnetic or optical signals that carry digital data streams. The signals through the various networks and the signals on network link 2020 and through communication interface 2018, which carry the digital data to and from computer system 2000, are example forms of transmission media.

Computer system 2000 can send messages and receive data, including program code, through the network(s), network link 2020 and communication interface 2018. In the Internet example, a server 2030 might transmit a requested code for an application program through Internet 2028, ISP 2026, local network 2022 and communication interface 2018.

The received code may be executed by processor 2004 as it is received, and/or stored in storage device 2010, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
   storing notification preference information and a user profile identifier in a user profile for each of a plurality of users, wherein the notification preference information specifies a manner for notifying that user of parked phone calls;
   receiving, at a communications endpoint device, an active phone call;
   receiving, from the communications endpoint device, one or more particular user profile identifiers, which identify one or more of the user profiles, of one or more users of the plurality of users;
   receiving, from the communications endpoint device, a request to park the active phone call;
   using the received the particular one or more user profile identifiers from the communications endpoint device to determine the notification preference information for each of the one or more users;
   parking the active phone call to produce a parked phone call; and
   notifying each of the one or more users of the parked phone call in the manner specified by that user's notification preference information;
   wherein the method is performed by one or more computing devices.

2. The method of claim 1, wherein receiving the particular one or more user profile identifiers of one or more users includes receiving the particular one or more user profile identifiers of the one or more users in the request to park the active phone call.

3. The method of claim 1, wherein receiving the request to park the active phone call includes receiving one or more voice over Internet Protocol (VoIP) messages.

4. The method of claim 3, wherein the one or more VoIP messages are one or more Session Initiation Protocol (SIP) messages.

5. The method of claim 1, wherein notifying at least one of the one or more users includes sending one or more e-mail messages.

6. The method of claim 1, wherein notifying at least of the one or more users includes sending one or more Short Message Service (SMS) messages.

7. The method of claim 1, wherein parking the active phone call includes assigning an orbit to the phone call.

8. The method of claim 1, wherein receiving the request to park the active phone call includes receiving one or more Hyper Text Transfer Protocol (HTTP) messages.

9. The method of claim 1, wherein the communications endpoint device has a touch-screen display.

10. The method of claim 1, further comprising receiving a text note from the communications endpoint device; and wherein notifying each of the one or more users of the parked phone call includes sending a message to each of the one or more users that includes the text note.

11. The method of claim 1, wherein notifying at least one user of the one or more users of the parked phone call includes causing a push notification to be received at a communications endpoint device of the at least one user.

12. A computer-implemented method, comprising:
at a communications endpoint device with a touch-screen display:
displaying a first graphical user interface on the touch-screen display that allows a user of the communications endpoint device to initiate a park of an active call;
after the park of the active call has been initiated by the user through the first user interface, displaying a second graphical user interface on the touch-screen display that allows the user to specify one or more users of a plurality of users that are to receive notification when the active call is actually parked;
receiving, through said second graphical user interface, a specification of one or more users of the plurality of users that are to receive notification when the active call is actually parked;
in response to input received through a graphical user interface displayed on the touch-screen display requesting to actually park the active phone call,
sending, to a server, identifiers of the one or more users specified through said second graphical user interface, and
sending, to a server, a request to actually park the active phone call; and
receiving, from a server, confirmation that the active phone call was actually parked.

13. The method of claim 12, wherein sending the identifiers of one or more users includes sending the identifiers of the one or more users in the request to actually park the active phone call.

14. The method of claim 12, wherein receiving the request to park the active phone call includes sending one or more voice over Internet Protocol (VoIP) messages to a server.

15. The method of claim 14, wherein the one or more VoIP messages are one or more Session Initiation Protocol (SIP) messages.

16. The method of claim 12, wherein the received confirmation includes receiving an orbit assigned to the parked phone call; and wherein the method further comprises displaying the orbit on the touch-screen display.

17. The method of claim 12, wherein sending the request to actually park the active phone call includes sending one or more Hyper Text Transfer Protocol (HTTP) messages to a server.

18. A system comprising:
one or more server computing devices;
a communications endpoint device with a touch-screen display;
one or more non-transitory computer-readable media storing instructions which, when executed by the one or more server computing devices, cause performance of:
storing notification preference information for each of a plurality of users that specifies a manner for notifying that user of parked phone calls;
receiving, from the communications endpoint device, identifiers of one or more users of the plurality of users;
receiving, from the communications endpoint device, a request to park an active phone call;
using the received identifiers to determine the notification preference information for each of the one or more users;
parking the active phone call to produce a parked phone call; and
notifying each of the one or more users of the parked phone call in the manner specified by that user's notification preference information;
the system further comprising one or more non-transitory computer-readable media storing instructions which, when executed by the communications endpoint device, cause performance of:
at the communications endpoint device with the touch-screen display:
displaying a first graphical user interface on the touch-screen display that allows a user of the communications endpoint device to initiate a park of an active call;
after the park of the active call has been initiated by the user through the first user interface, displaying a second graphical user interface on the touch-screen display that allows the user to specify one or more users of a plurality of users that are to receive notification when the active call is actually parked;
receiving, through said second graphical user interface, a specification of one or more users of the plurality of users that are to receive notification when the active call is actually parked;
in response to input received through a graphical user interface displayed on the touch-screen display requesting to actually park the active phone call,
sending, to a server computing of the one or more server computing devices, identifiers of the one or more users specified through said second graphical user interface, and
sending, to a server computing of the one or more server computing devices, a request to actually park the active phone call; and
receiving, from a server computing device of the one or more server computing devices, confirmation that the active phone call was actually parked.

* * * * *